US010737986B2

(12) United States Patent
Roberts et al.

(10) Patent No.: US 10,737,986 B2
(45) Date of Patent: Aug. 11, 2020

(54) METHODS FOR REPAIRING COMPOSITE CYLINDERS

(71) Applicant: General Electric Company, Schenectady, NY (US)

(72) Inventors: Herbert Chidsey Roberts, Middletown, OH (US); Glenn Curtis Taxacher, Simpsonville, SC (US); Nicholas John Bloom, Maineville, OH (US); Patrick Wayne Hollingsworth, North East, MD (US)

(73) Assignee: General Electric Company, Schenectady, NY (US)

( * ) Notice: Subject to any disclaimer, the term of this patent is extended or adjusted under 35 U.S.C. 154(b) by 457 days.

(21) Appl. No.: 15/708,203

(22) Filed: Sep. 19, 2017

(65) Prior Publication Data

US 2019/0084894 A1    Mar. 21, 2019

(51) Int. Cl.
*C04B 37/02* (2006.01)
*C04B 37/00* (2006.01)
(Continued)

(52) U.S. Cl.
CPC .......... *C04B 37/023* (2013.01); *C04B 37/003* (2013.01); *F23R 3/002* (2013.01); *F23R 3/007* (2013.01); *B29C 73/04* (2013.01); *B29C 2073/264* (2013.01); *C04B 2235/5224* (2013.01); *C04B 2235/5228* (2013.01); *C04B 2235/5244* (2013.01); *C04B 2235/5248* (2013.01); *C04B 2237/341* (2013.01); *C04B 2237/343* (2013.01); *C04B 2237/365* (2013.01); *C04B 2237/38* (2013.01); *C04B 2237/405* (2013.01); *C04B 2237/55* (2013.01); *C04B 2237/61* (2013.01); *C04B 2237/765* (2013.01); *C04B 2237/78* (2013.01);
(Continued)

(58) Field of Classification Search
CPC ......... Y10T 29/49737; Y10T 29/49735; Y10T 29/49734; Y10T 29/49732; B29C 73/04
See application file for complete search history.

(56) References Cited

U.S. PATENT DOCUMENTS 3,885,071 A * 5/1975 Blad ................... B29C 37/0082
428/60
4,517,038 A * 5/1985 Miller .................... B29C 73/10
156/94
(Continued)

*Primary Examiner* — Jason L Vaughan
(74) *Attorney, Agent, or Firm* — Dority & Manning, P.A.

(57) ABSTRACT

Methods for repairing composite cylindrical components are provided. One exemplary method for repairing a cylindrical component defining an axial direction, a radial direction, and a circumferential direction includes removing a damaged region of the cylindrical component. A flange extending from a cylindrical body of the cylindrical component is included in the damaged region. One or more arc segments that extend along the circumferential direction are connected with the existing cylindrical component. At least one of the arc segments includes a prefabricated flange. One or more plies are laid up to connect the arc segments with the existing cylindrical component to repair the damaged region of the cylindrical body and the prefabricated flange formed integrally with one of the arc segments replaces the damaged portion of the flange. Repaired cylindrical components are also provided.

19 Claims, 14 Drawing Sheets

(51) Int. Cl.
  *F23R 3/00*  (2006.01)
  *F27D 1/16*  (2006.01)
  *B29C 73/26* (2006.01)
  *B29C 73/04* (2006.01)
(52) U.S. Cl.
  CPC ...... *F05D 2230/80* (2013.01); *F05D 2240/35* (2013.01); *F05D 2300/6033* (2013.01); *F23M 2700/0053* (2013.01); *F23R 2900/00019* (2013.01); *F27D 1/16* (2013.01); *Y10T 29/49732* (2015.01); *Y10T 29/49734* (2015.01); *Y10T 29/49737* (2015.01)

(56) References Cited

U.S. PATENT DOCUMENTS

| | | | |
|---|---|---|---|
| 4,896,408 A * | 1/1990 | Fraser | B23P 15/04 29/889.1 |
| 5,601,676 A * | 2/1997 | Zimmerman | B29C 66/1142 156/304.3 |
| 5,958,166 A * | 9/1999 | Walters | B29C 73/04 156/94 |
| 6,820,334 B2 * | 11/2004 | Kebbede | B23P 6/005 29/889.1 |
| 6,997,260 B1 | 2/2006 | Trader et al. | |
| 7,935,205 B2 | 5/2011 | Bogue et al. | |
| 8,108,979 B2 | 2/2012 | Stadtlander et al. | |
| 8,230,569 B2 | 7/2012 | Anantharaman et al. | |
| 8,409,396 B2 * | 4/2013 | Bech | B29C 66/73941 156/304.5 |
| 8,475,615 B2 * | 7/2013 | Deleris | B29C 73/10 156/98 |
| 8,540,909 B2 * | 9/2013 | Dan-Jumbo | B29C 73/10 264/36.1 |
| 8,770,933 B2 | 7/2014 | Chen et al. | |
| 8,826,534 B2 * | 9/2014 | Cappelli | B29C 73/10 29/402.09 |
| 8,895,887 B2 | 11/2014 | Trapp et al. | |
| 8,993,090 B2 * | 3/2015 | Boulet | B29C 73/14 428/137 |
| 9,186,756 B2 * | 11/2015 | Shigetomi | B32B 3/12 |
| 9,593,595 B2 | 3/2017 | Nava et al. | |
| 9,903,523 B2 * | 2/2018 | Kiest, Jr. | B23P 6/04 |
| 2003/0196305 A1 * | 10/2003 | Kebbede | B23P 6/005 29/402.11 |
| 2007/0077148 A1 | 4/2007 | Bird | |
| 2010/0183431 A1 * | 7/2010 | Anantharaman | B23P 6/005 415/182.1 |
| 2012/0132344 A1 * | 5/2012 | Deleris | B29C 73/10 156/98 |
| 2012/0301702 A1 | 11/2012 | Nishimura | |
| 2013/0086785 A1 | 4/2013 | Cui et al. | |
| 2014/0329043 A1 * | 11/2014 | Shigetomi | F02C 7/045 428/63 |
| 2016/0075063 A1 | 3/2016 | Hannecart et al. | |

\* cited by examiner

```
500 ─┐
                                                                    ┌─ 502
    ┌─────────────────────────────────────────────────────────────┐
    │ REMOVING THE DAMAGED REGION, WHEREIN AT LEAST A PORTION OF THE │
    │         FLANGE IS DISPOSED WITHIN THE DAMAGED REGION            │
    └─────────────────────────────────────────────────────────────┘
                                  │
                                  ▼                                 ┌─ 504
    ┌─────────────────────────────────────────────────────────────┐
    │  FORMING A FIRST ATTACHMENT PORTION AND A SECOND ATTACHMENT PORTION │
    │   INTO THE CYLINDRICAL BODY OF THE CYLINDRICAL COMPONENT, THE FIRST │
    │      ATTACHMENT PORTION AND THE SECOND ATTACHMENT PORTION EACH     │
    │ EXTENDING ALONG THE AXIAL DIRECTION AND SPACED APART FROM ONE ANOTHER │
    │              ALONG THE CIRCUMFERENTIAL DIRECTION                    │
    └─────────────────────────────────────────────────────────────┘
                                  │
                                  ▼                                 ┌─ 506
    ┌─────────────────────────────────────────────────────────────┐
    │  CONNECTING AN ARC SEGMENT COMPRISING A PREFABRICATED FLANGE SHAPED │
    │  COMPLEMENTARY TO THE FLANGE WITH THE CYLINDRICAL COMPONENT, WHEREIN THE │
    │     ARC SEGMENT EXTENDS BETWEEN A FIRST ATTACHMENT END AND A SECOND │
    │   ATTACHMENT END ALONG THE CIRCUMFERENTIAL DIRECTION, AND WHEREIN THE FIRST │
    │       ATTACHMENT END CONNECTS WITH THE FIRST ATTACHMENT PORTION OF THE │
    │     CYLINDRICAL COMPONENT AND THE SECOND ATTACHMENT END CONNECTS WITH THE │
    │      SECOND ATTACHMENT PORTION OF THE CYLINDRICAL COMPONENT, AND WHEREIN │
    │            WHEN THE ARC SEGMENT IS CONNECTED WITH THE CYLINDRICAL │
    │   COMPONENT, THE PREFABRICATED FLANGE FORMS AT LEAST A PART OF THE FLANGE │
    └─────────────────────────────────────────────────────────────┘
                                  │
                                  ▼                                 ┌─ 508
    ┌─────────────────────────────────────────────────────────────┐
    │           CONNECTING THE ARC SEGMENT AND THE CYLINDRICAL        │
    │              COMPONENT WITH ONE OR MORE PLIES                  │
    └─────────────────────────────────────────────────────────────┘
```

*FIG. 15*

METHODS FOR REPAIRING COMPOSITE CYLINDERS

FIELD

The present subject matter relates generally to repairing components of gas turbine engines. More particularly, the present subject matter relates to repair of composite cylindrical components of gas turbine engines.

BACKGROUND

A gas turbine engine generally includes a fan and a core arranged in flow communication with one another. Additionally, the core of the gas turbine engine generally includes, in serial flow order, a compressor section, a combustion section, a turbine section, and an exhaust section. In operation, air is provided from the fan to an inlet of the compressor section where one or more axial compressors progressively compress the air until it reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere.

More commonly, non-traditional high temperature materials, such as ceramic matrix composite (CMC) materials, are being used as structural components within gas turbine engines. For example, given the ability for CMC materials to withstand relatively extreme temperatures, there is particular interest in replacing components within the combustion section of the gas turbine engine with CMC materials. For instance, combustor liners of the combustor for gas turbine engines are more commonly being formed of CMC materials.

Such composite components can become damaged or worn during operation. In some instances, it is desirable to repair such components. However, cylindrical composite components, such as e.g., combustor liners, have been challenging to repair. Cylindrical composite components damaged proximate their flanges have been particularly difficult to repair. When the flanges are damaged, the cylinder loses a significant amount of stiffness. The lack of rigidity in the cylinder flange impacts the shape of the cylinder and limits the cylinder from acting as a rigid body to support non-mold repairs. Therefore, additional tooling is required to perform such repairs.

Accordingly, improved methods for repairing composite cylinders for gas turbine engines would be desirable. In particular, improved methods for repairing composite cylinders damaged proximate one or more flanges of the cylinder would be useful. Further, composite cylinders repaired by such improved methods would be advantageous.

BRIEF DESCRIPTION

Aspects and advantages of the invention will be set forth in part in the following description, or may be obvious from the description, or may be learned through practice of the invention.

In one exemplary embodiment of the present disclosure, a method for repairing a cylindrical component is provided. The cylindrical component defines an axial direction, a radial direction, and a circumferential direction. The cylindrical component has a first attachment portion and a second attachment portion spaced apart from the first attachment portion along the circumferential direction and an arc attachment portion extending along the circumferential direction and connecting the first attachment portion with the second attachment portion. The method includes connecting an arc segment with the cylindrical component, wherein the arc segment extends between a first attachment end and a second attachment end along the circumferential direction, and wherein the first attachment end connects with the first attachment portion of the cylindrical component and the second attachment end connects with the second attachment portion of the cylindrical component. The method also includes connecting the arc segment with the arc attachment portion of the cylindrical component with one or more plies.

In another exemplary embodiment of the present disclosure, a method for repairing a cylindrical component is provided. The cylindrical component defines a damaged region prior to being repaired and an axial direction, a radial direction, and a circumferential direction. The cylindrical component includes a cylindrical body extending along the axial direction and a flange extending from the cylindrical body along the radial direction and disposed about the cylindrical body along the circumferential direction. The method includes removing the damaged region, wherein at least a portion of the flange is disposed within the damaged region. The method also includes forming a first attachment portion and a second attachment portion into the cylindrical body of the cylindrical component, the first attachment portion and the second attachment portion each extending along the axial direction and spaced apart from one another along the circumferential direction. The method also includes connecting an arc segment comprising a prefabricated flange shaped complementary to the flange with the cylindrical component, wherein the arc segment extends between a first attachment end and a second attachment end along the circumferential direction, and wherein the first attachment end connects with the first attachment portion of the cylindrical component and the second attachment end connects with the second attachment portion of the cylindrical component, and wherein when the arc segment is connected with the cylindrical component, the prefabricated flange forms at least a part of the flange. The method further includes connecting the arc segment and the cylindrical component with one or more plies.

In a further exemplary embodiment of the present disclosure, a repaired cylindrical component for a gas turbine engine is provided. The repaired cylindrical component defines an axial direction, a radial direction, and a circumferential direction, as well as a repaired portion and non-repaired portion. The repaired cylindrical component includes a cylindrical body extending along the axial direction, the cylindrical body being formed at least in part by the repaired portion and at least in part by the non-repaired portion, and wherein the repaired portion of the cylindrical body comprises one or more arc segments extending along the circumferential direction and connecting with the non-repaired portion, and wherein the repaired portion further comprises one or more plies laid up along the axial direction to connect the one or more arc segments with the non-repaired portion of the cylindrical body. The repaired cylindrical component also includes a flange extending from the cylindrical body along the radial direction and disposed about the cylindrical body along the circumferential direction, the flange being formed at least in part by the repaired portion and at least in part by the non-repaired portion, and wherein the repaired portion of the flange comprises a prefabricated flange formed integrally with one of the one or more arc segments.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 15 provides an exemplary flow diagram for an exemplary method according to various embodiments of the present subject matter.

Figure 1:
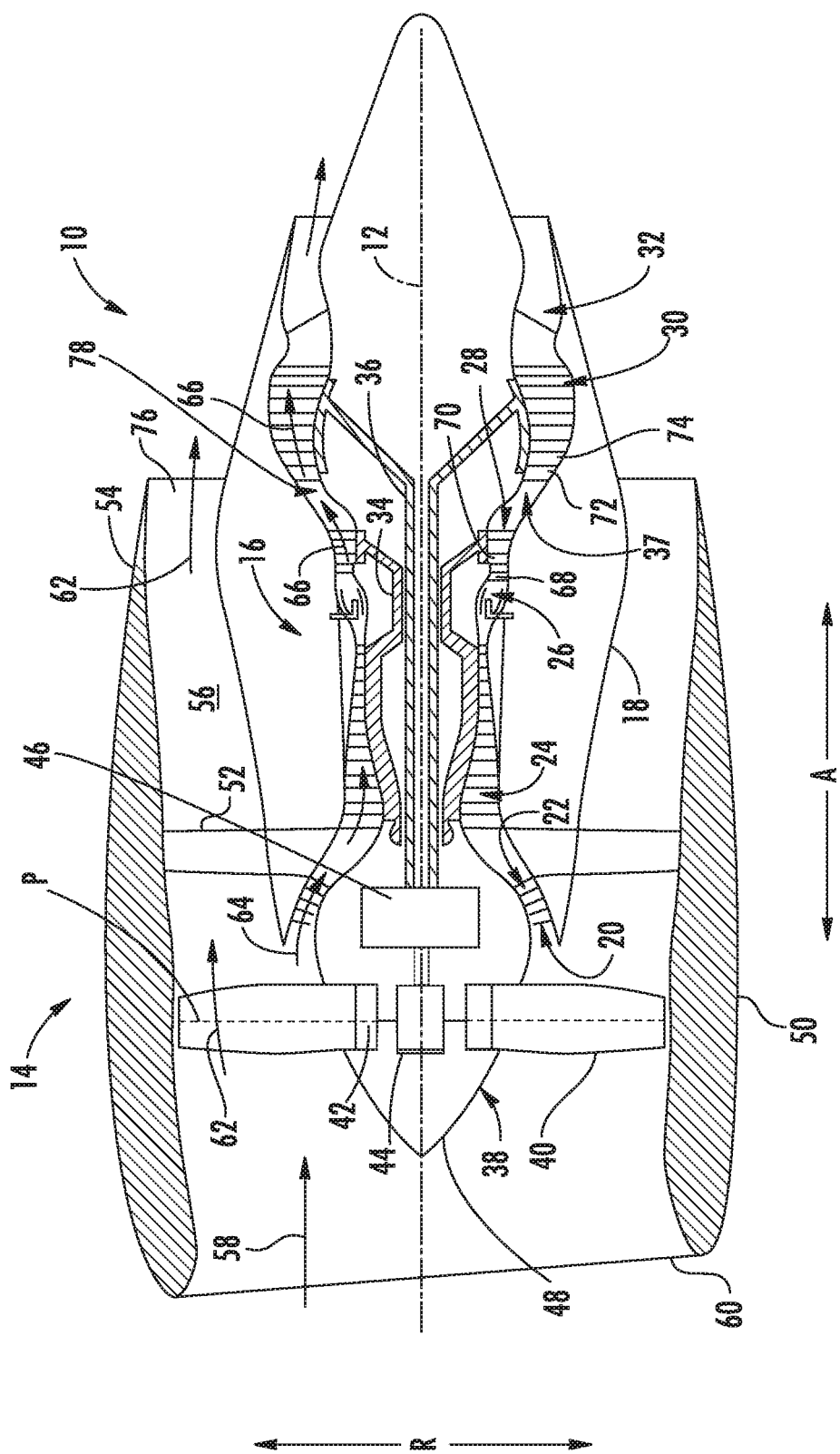
FIG. 1 provides a schematic cross-sectional view of an exemplary gas turbine engine according to various exemplary embodiments of the present subject matter.

Repeat use of reference characters in the present specification and drawings is intended to represent the same or analogous features or elements of the present invention.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first," "second," and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows and "downstream" refers to the direction to which the fluid flows. As used herein, the term "about" means within ten percent of the stated value. "Cylindrical component" as used herein refers to any component having a rounded body with a generally circular or oval-shaped cross section. For instance, by way of example, cylindrical component is inclusive of circular cylinders, oval cylinders, elliptical cylinders, parabolic cylinders, hyperbolic cylinders, etc. Cylindrical component is also inclusive of components having rounded or annularly extending bodies that have cross sections with different areas at their ends, including, for example, conical frustums and other tubular shapes. For instance, an engine case, combustion liner, can combustor, etc. is considered a cylindrical component as contemplated by the present disclosure.

Aspects of the present disclosure are directed to methods for repairing composite cylindrical components, such as e.g., a CMC combustor liner of a gas turbine engine. In one exemplary aspect, a cylindrical component defines an axial direction, a radial direction, and a circumferential direction. The cylindrical component also defines a damaged region. A flange extending from a cylindrical body of the cylindrical component is included in the damaged region. An exemplary method for repairing such damaged cylindrical components includes removing the damaged region, including the damaged flange. Next, one or more arc segments that extend along the circumferential direction are connected with the existing cylindrical component. At least one of the arc segments includes a prefabricated flange. One or more plies are laid up to connect the arc segments with the existing cylindrical component to repair the damaged region of the cylindrical body and the prefabricated flange replaces the damaged portion of the flange. The arc segments are formed of a rigid material so that they can structurally support the repair plies laid up to connect the arc segments with the existing cylindrical component. Aspects of the present disclosure are also directed to repaired cylindrical components for gas turbine engines.

FIG. 1 provides a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. In other embodiments of turbofan engine 10, additional spools may be provided such that engine 10 may be described as a multi-spool engine.

For the depicted embodiment, fan section 14 includes a fan 38 having a plurality of fan blades 40 coupled to a disk 42 in a spaced apart manner. As depicted, fan blades 40 extend outward from disk 42 generally along the radial direction R. The fan blades 40 and disk 42 are together rotatable about the longitudinal axis 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass airflow passage 56 therebetween.

During operation of the turbofan engine 10, a volume of air 58 enters turbofan 10 through an associated inlet 60 of the nacelle 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

It will be appreciated that, although described with respect to turbofan 10 having core turbine engine 16, the present subject matter may be applicable to other types of turbomachinery. For example, the present subject matter may be suitable for use with or in turboprops, turboshafts, turbojets, industrial and marine gas turbine engines, and/or auxiliary power units.

In some embodiments, components of turbofan engine 10, particularly components within hot gas path 78, such as components of combustion section 26, HP turbine 28, and/or LP turbine 30, may include a ceramic matrix composite (CMC) material, which is a non-metallic material having high temperature capability. Of course, other components of turbofan engine 10, such as components of HP compressor 24, may be formed of a CMC material or other composite materials. Exemplary CMC materials utilized for such components may include silicon carbide (SiC), silicon, silica, or alumina matrix materials and combinations thereof. Ceramic fibers may be embedded within the matrix, such as oxidation stable reinforcing fibers including monofilaments like sapphire and silicon carbide (e.g., Textron's SCS-6), as well as rovings and yarn including silicon carbide (e.g., Nippon Carbon's NICALON®, Ube Industries' TYRANNO®, and Dow Corning's SYLRAMIC®), alumina silicates (e.g., Nextel's 440 and 480), and chopped whiskers and fibers (e.g., Nextel's 440 and SAFFIL®), and optionally ceramic particles (e.g., oxides of Si, Al, Zr, Y, and combinations thereof) and inorganic fillers (e.g., pyrophyllite, wollastonite, mica, talc, kyanite, and montmorillonite). For example, in certain embodiments, bundles of the fibers, which may include a ceramic refractory material coating, are formed as a reinforced tape, such as a unidirectional reinforced tape. A plurality of the tapes may be laid up together (e.g., as plies) to form a preform component. The bundles of fibers may be impregnated with a slurry composition prior to forming the preform or after formation of the preform. The preform may then undergo thermal processing, such as a cure or burn-out to yield a high char residue in the preform, and subsequent chemical processing, such as melt-infiltration or chemical vapor infiltration with silicon, to arrive at a component formed of a CMC material having a desired chemical composition. In other embodiments, the CMC material may be formed as, e.g., a carbon fiber cloth rather than as a tape.

As stated, components that include a CMC material may be used within the hot gas path 78, such as within the combustion and/or turbine sections of turbofan engine 10. As an example, the combustion section 26 may include a combustor formed from a CMC material and/or one or more stages of one or more stages of the HP turbine 28 may be formed from a CMC material. However, CMC components may be used in other sections as well, such as the compressor and/or fan sections. In some embodiments, other high temperature materials and/or other composite materials may be used to form one or more components of turbofan engine 10.

Figure 2:
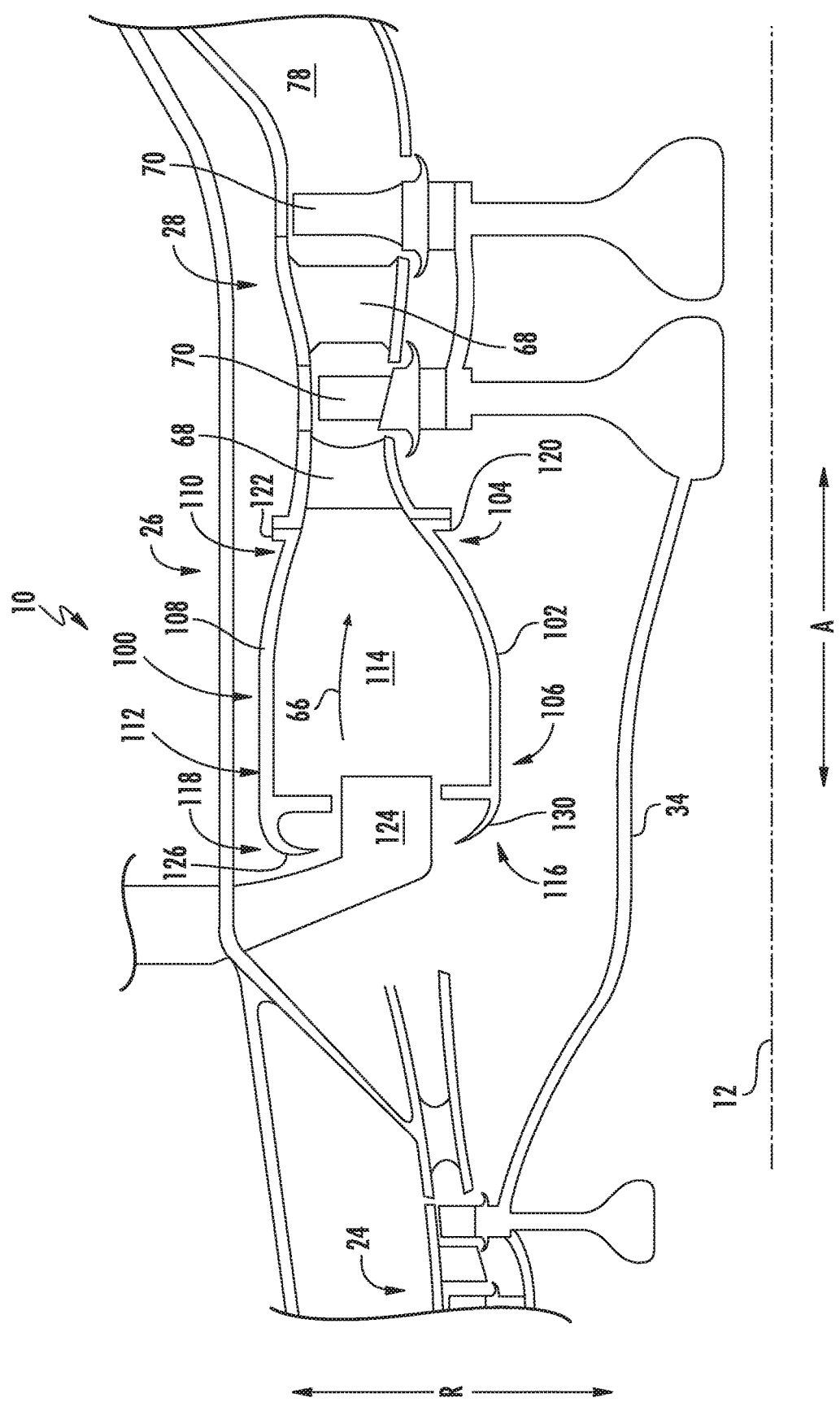
FIG. 2 provides a schematic, cross-sectional view of a combustor assembly and a portion of a turbine section of the gas turbine engine of FIG. 1.

FIG. 2 provides a schematic, cross-sectional view of a combustor assembly and a portion of a turbine section of the turbofan engine 10 of FIG. 1. More specifically, FIG. 2 provides a close-up view of an aft end of the HP compressor 24 of the compressor section, the combustion section 26, and the HP turbine 28 of the turbine section.

As shown, combustion section 26 includes a combustor assembly 100. The combustor assembly 100 generally includes an inner liner 102 extending between an aft end 104 and a forward end 106 generally along the axial direction A, as well as an outer liner 108 also extending between an aft end 110 and a forward end 112 generally along the axial direction A. For this embodiment, the inner liner 102 and the outer liner 108 are each formed of a CMC material. The inner and outer liners 102, 108 together at least partially define a combustion chamber 114 therebetween. Moreover, notably, the inner liner 102 includes a flange 120 extending radially inward proximate the aft end 104 of the inner liner 102 and the outer liner 104 includes a flange 122 extending radially outward proximate the aft end 110 of the outer liner 108. As shown, the flange 120 extending from the inner liner 102 is connected with an adjacent flange of an inner band of the first stage nozzle. Similarly, the flange 122 extending from the outer liner 108 is connected with an adjacent flange of an outer band of the first stage nozzle.

The inner and outer liners 102, 108 are each attached to or formed integrally with an annular dome. The annular dome includes an inner dome section 116 formed integrally with the forward end 106 of the inner liner 102 and an outer dome section 118 formed generally with the forward end 112 of the outer liner 108. Further, the inner and outer dome sections 116, 118 may each be formed integrally (or alternatively may be formed of a plurality of components attached in any suitable manner) and may each extend along the circumferential direction C to define an annular shape. It should be appreciated, however, that in other embodiments, the combustor assembly 100 may not include the inner and/or outer dome sections 116, 118; may include separately formed inner and/or outer dome sections 116, 118 attached to the respective inner liner 102 and outer liner 108; or may have any other suitable configuration.

Referring still to FIG. 2, the combustor assembly 100 further includes a plurality of fuel air mixers 124 spaced along the circumferential direction C (not shown) and positioned at least partially within the annular dome. More particularly, the plurality of fuel air mixers 124 are disposed at least partially between the outer dome section 118 and the inner dome section 116 along the radial direction R. Compressed air from the compressor section of the turbofan engine 10 flows into or through the fuel air mixers 124, where the compressed air is mixed with fuel and ignited to create the combustion gases 66 within the combustion chamber 114. The inner and outer dome sections 116, 118 are configured to assist in providing such a flow of compressed air from the compressor section into or through the fuel air mixers 124. For example, the outer dome section 118 includes an outer cowl 126 at a forward end and the inner dome section 116 similarly includes an inner cowl 130 at a forward end. The outer cowl 126 and inner cowl 130 may assist in directing the flow of compressed air from the compressor section 26 into or through one or more of the fuel air mixers 124. Again, however, in other embodiments, the annular dome may be configured in any other suitable manner.

Referring still to FIG. 2, and as is discussed above, the combustion gases 66 flow from the combustion chamber 114 into and through the turbine section of the turbofan engine 10, where a portion of thermal and/or kinetic energy from the combustion gases 66 is extracted via sequential stages of turbine stator vanes and turbine rotor blades within the HP turbine 28 and LP turbine 30 (FIG. 1). More specifically, as depicted in FIG. 2, combustion gases 66 from the combustion chamber 114 flow into the HP turbine 28, located immediately downstream of the combustion chamber 114, where thermal and/or kinetic energy from the combustion gases 66 is extracted via sequential stages of HP turbine stator vanes 68 and HP turbine rotor blades 70. As also discussed above with reference to FIG. 1, the HP turbine 28 is coupled to the HP compressor 24 via the HP shaft 34. Accordingly, rotation of the plurality of stages of HP turbine rotor blades 70 correspondingly rotates a plurality of stages of HP compressor rotor blades.

During operation of the turbofan engine 10, various components, such as e.g., the inner and/or outer liners 102, 104, the flanges 120, 122 of the inner and outer liners 102, 104, turbine blades, etc. are subjected to extreme pressures and/or temperatures causing deterioration of such components over time. In some instances, damaged or deteriorated cylindrical components are removed from the turbofan engine 10 and repaired. As described more fully below, exemplary methods are provided for repair of cylindrical components of the turbofan engine 10. Resulting or repaired cylindrical components are also provided.

Figure 3:
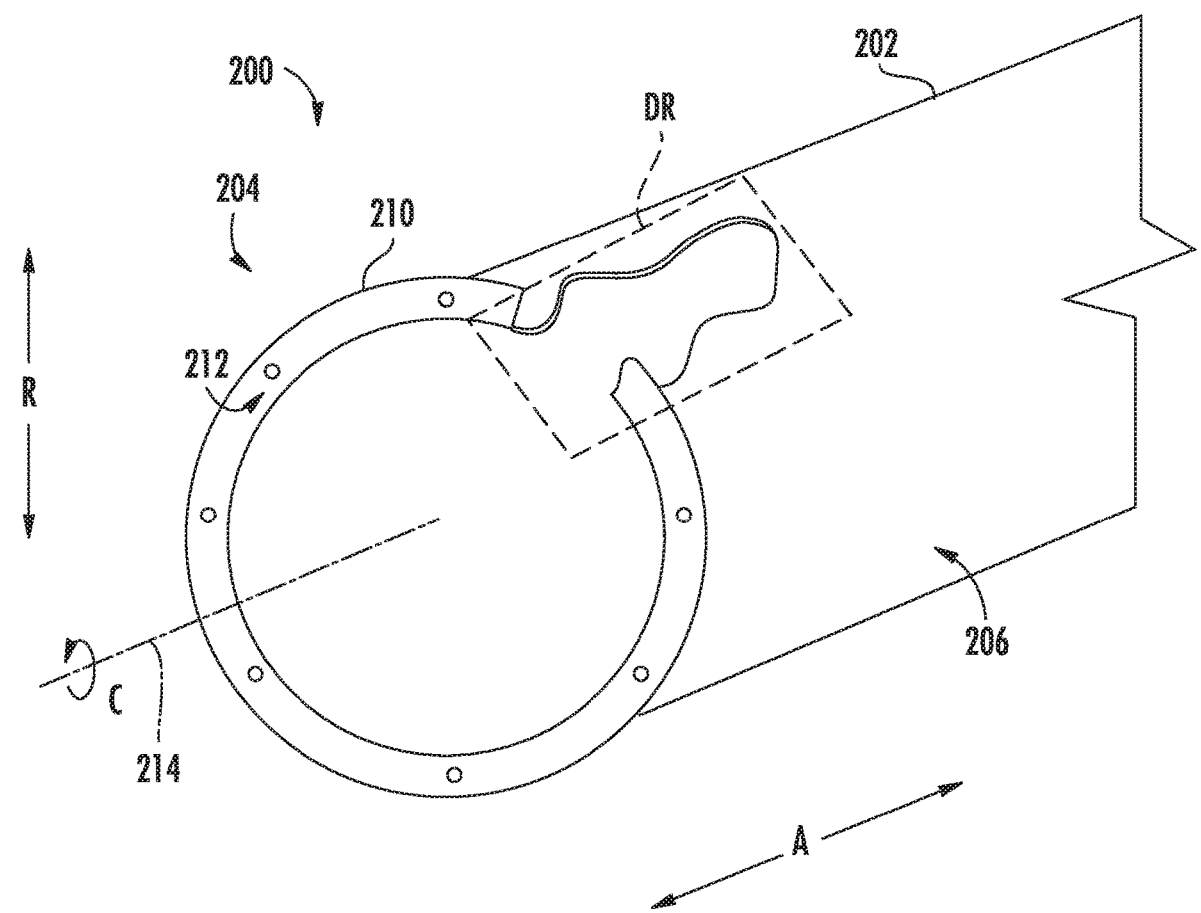
FIG. 3 provides a perspective view of an exemplary cylindrical component having a damaged region according to various exemplary embodiments of the present subject matter.
Figure 4:
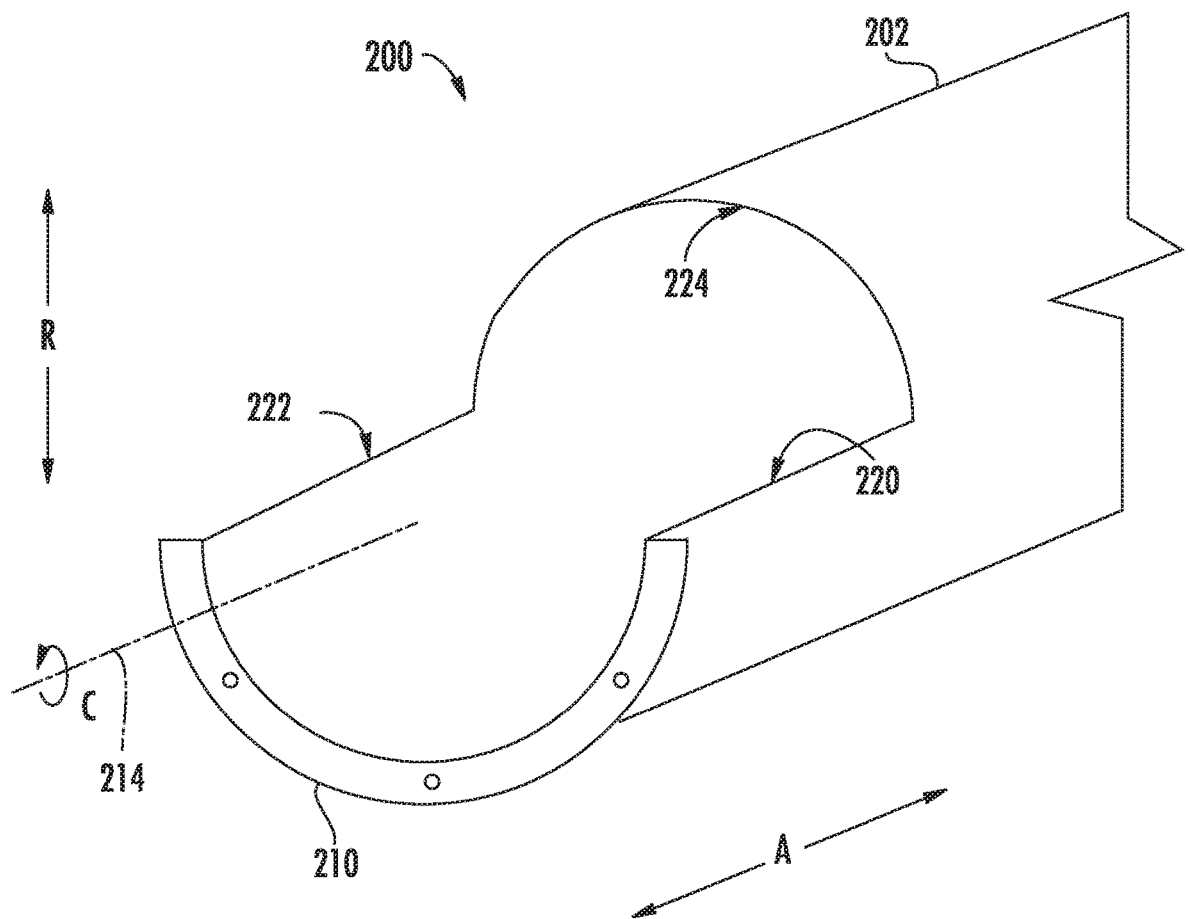
FIG. 4 provides a perspective view of the cylindrical component of FIG. 3 with the damaged region removed.
Figure 5:
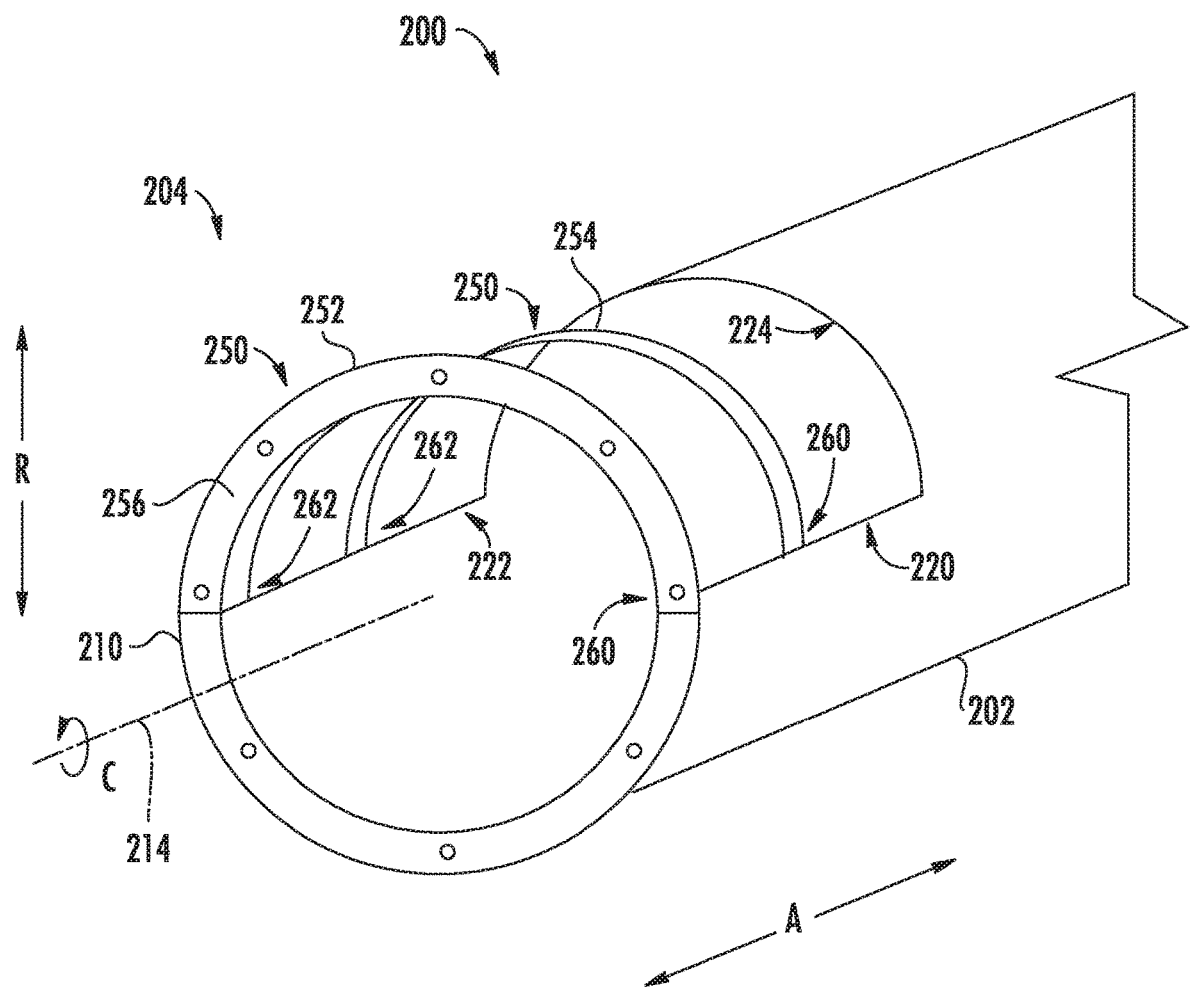
FIG. 5 provides a perspective view of the cylindrical component of FIG. 3 with arc segments attached to the cylindrical component.
Figure 6:
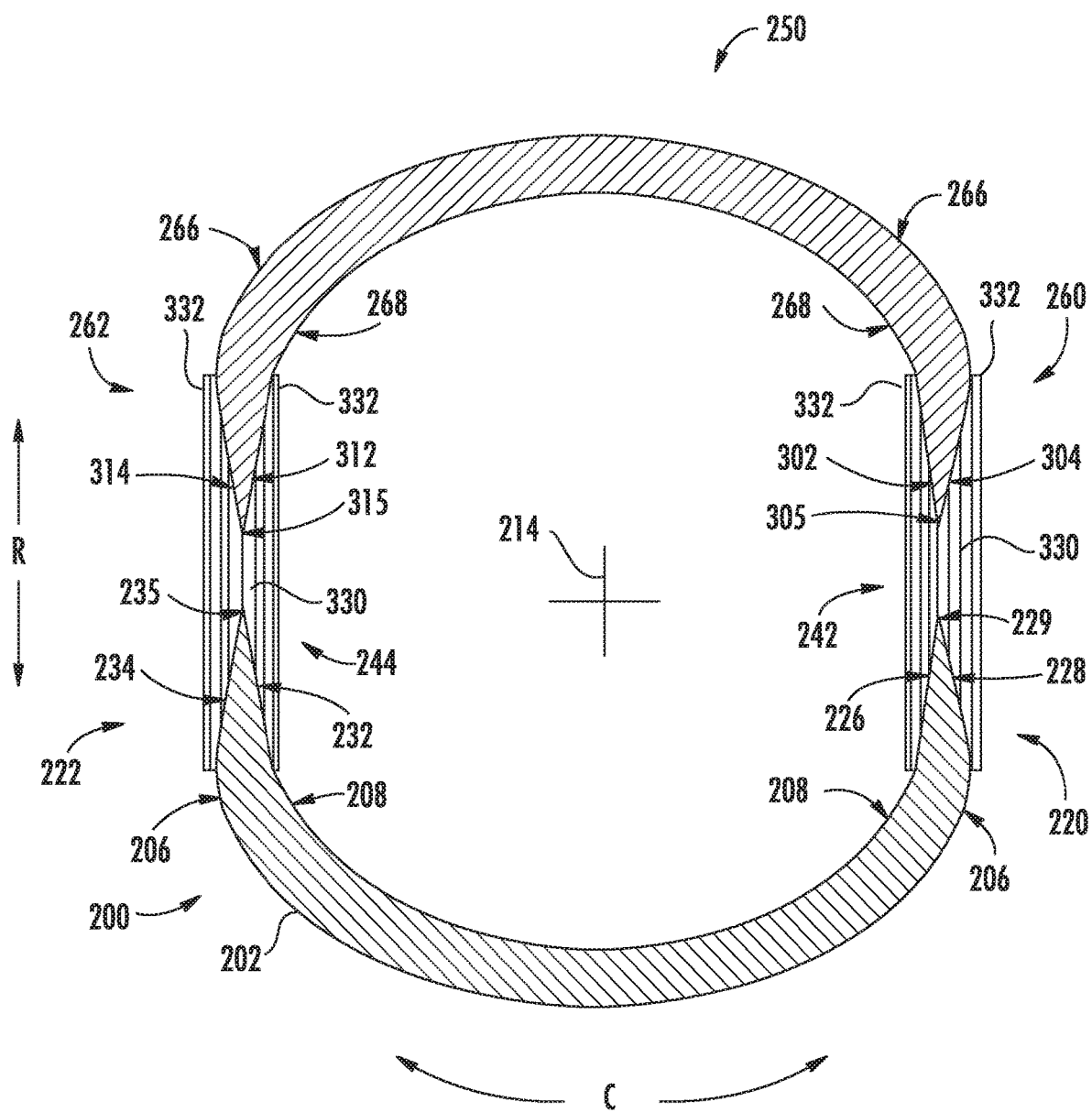
FIG. 6 provides an axial cross-sectional view of the cylindrical component of FIG. 5 depicting one of the arc segments connecting thereto.
Figure 7:
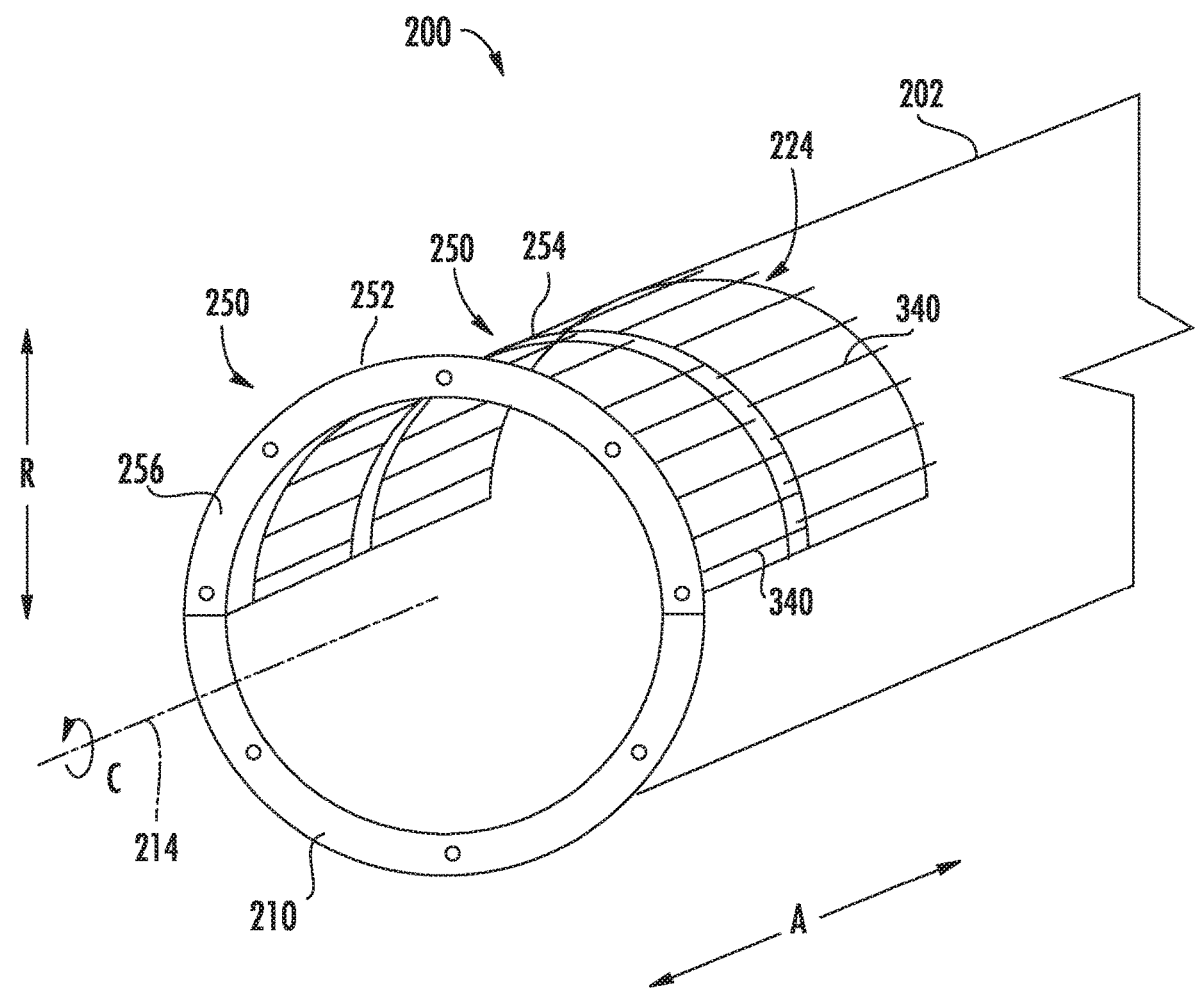
FIG. 7 provides a perspective view of the cylindrical component of FIG. 6 with plies extending between and connecting the arc segments with one another and the cylindrical component.
Figure 8:
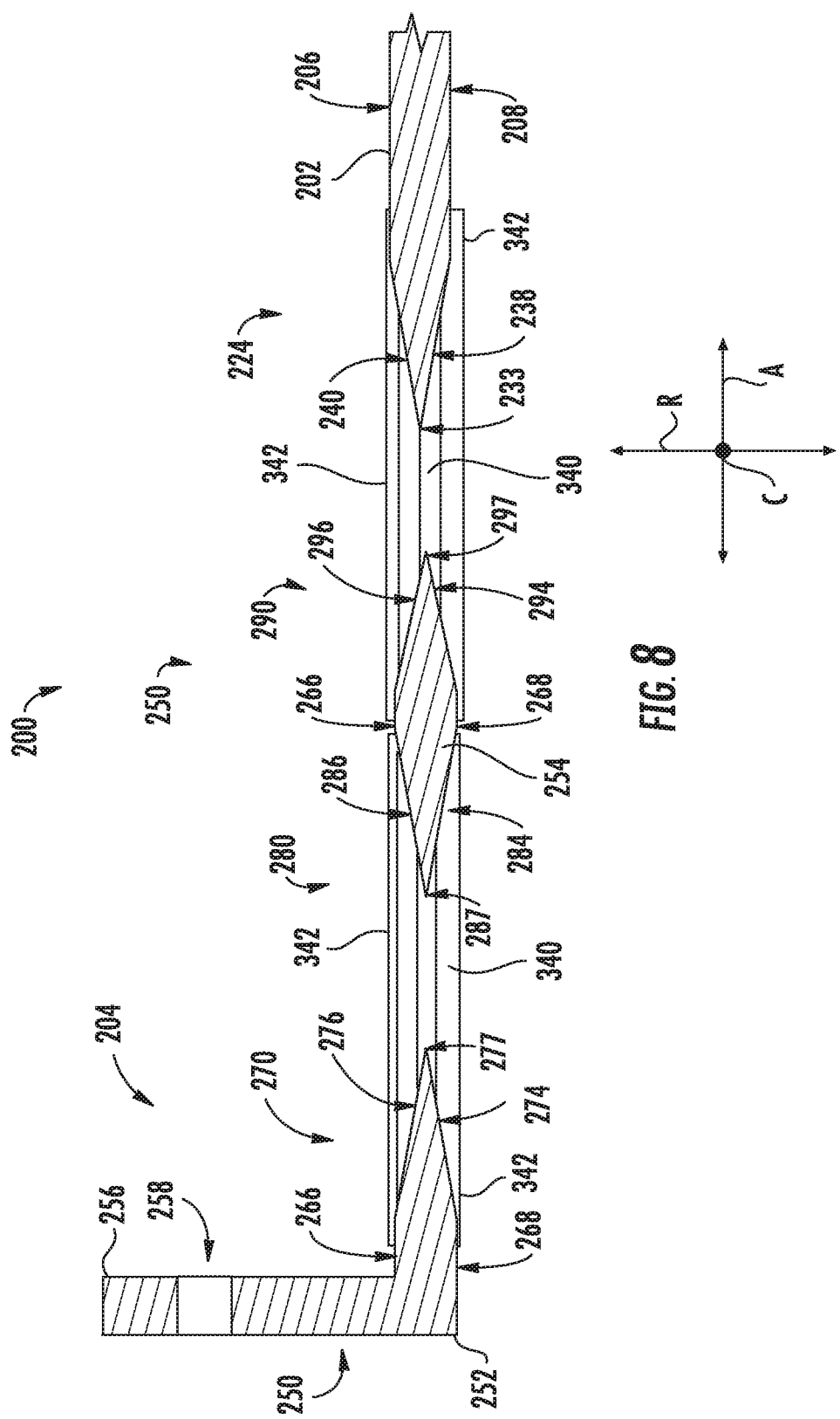
FIG. 8 provides a circumferential cross-sectional view of the cylindrical component of FIG. 7 depicting plies connecting the arc segments with one another and the cylindrical component.

FIGS. 3 through 8 provide an exemplary method for repairing a damaged composite cylindrical component, such as e.g., a CMC combustor liner illustrated and described in FIG. 2. In particular, FIG. 3 provides a perspective view of an exemplary composite cylindrical component defining a damaged region. FIG. 4 provides a perspective view thereof with the damaged region removed. FIG. 5 provides a perspective view thereof with arc segments attached to the cylindrical component. FIG. 6 provides a forward looking aft view of the cylindrical component of FIG. 5 depicting one of the arc segments connected with the cylindrical component. FIG. 7 provides a perspective view of the cylindrical component with plies extending between and connecting the arc segments with one another and the cylindrical component. FIG. 8 provides a circumferential cross-sectional view of the cylindrical component of FIG. 7 depicting plies connecting the arc segments with one another and the cylindrical component.

As shown in FIG. 3, cylindrical component 200 has a cylindrical body 202 extending along the axial direction A between a first end 204 and a second end (not shown). The cylindrical body 202 also extends along the circumferential direction C about a longitudinal centerline 214. The cylindrical body 202 has a thickness defined between an outer surface 206 and an opposing inner surface 208 (FIG. 8) along the radial direction R. A flange 210 extends from the cylindrical body 202 along the radial direction R and is disposed about the cylindrical body 202 along the circumferential direction C. For this embodiment, the flange 210 extends from the cylindrical body 202 proximate the first end 204 of the cylindrical body 202. The flange 210 defines a plurality of holes 212 circumferentially spaced apart from one another. Mechanical fasteners can be inserted into the holes 212 to attach the flange 210 with an adjacent flange of another component of a gas turbine engine, for example.

As further shown in FIG. 3, the cylindrical component 200 has experienced significant deterioration, and more particularly, the cylindrical component 200 has experienced significant abrasion or wear along its cylindrical body 202 and flange 210. Indeed, for this embodiment, a portion of the cylindrical body 202 and flange 210 have broken away. In this way, the cylindrical component 200 defines a damaged region DR, which is shown within the dashed lines proximate the flange 210 in FIG. 3. Composite cylindrical components for gas turbine engines can experience a wide variety of damage types or failures, including microstructural changes, cracks, abrasion, deformation, and entire breakages. Such deterioration negatively affects engine performance and efficiency. As noted above, in some instances, it is desirable to repair such deteriorated composite cylindrical components.

As shown in FIG. 4, the damaged region DR (FIG. 3) has been removed. The damaged region DR can be removed by any suitable material removal tool, such as e.g., a cutting tool. For this embodiment, a number of attachment portions are formed when the damaged region DR is removed. In particular, a first attachment portion 220, a second attachment portion 222, and an arc attachment portion 224 are formed into the cylindrical body 202 of the cylindrical component 200 as shown in FIG. 4. The first attachment portion 220 and the second attachment portion 222 both extend along the axial direction A and are spaced apart from one another along the circumferential direction C. Specifically, in this embodiment, the first attachment portion 220 is spaced apart from the second attachment portion 222 half of the arc of the cylindrical body 202 along the circumferential direction C. In other embodiments, however, the first attachment portion 220 need not be spaced apart from the second attachment portion 222 half of the arc of the cylindrical body 202 along the circumferential direction C. For instance, the first attachment portion 220 can be spaced apart from the second attachment portion 222 more than half or less than half of the arc of the cylindrical body 202 along the circumferential direction C. The arc attachment portion 224 formed into the cylindrical body 202 extends along the circumferential direction C and connects the first attachment portion 220 with the second attachment portion 222 as shown in FIG. 4.

As shown in FIG. 5, after the various attachment portions are formed into the cylindrical component 200, one or more arc segments 250 are connected with the cylindrical component 200. In particular, for this embodiment, a first arc segment 252 is connected to the cylindrical component 200 proximate the flange 210, which in this embodiment is proximate the first end 204 of the cylindrical component 200. Moreover, the first arc segment 252 includes a prefabricated flange 256 shaped complementary to the flange 210 of the cylindrical component 200. As illustrated in FIG. 5, when the first arc segment 252 is connected with the cylindrical component 200, the prefabricated flange 256 forms at least a part of the flange 210 of the cylindrical component 200. In this way, the missing portion of the flange 210 can be replaced. Moreover, for this embodiment, the prefabricated flange 256 defines holes 258 that are spaced apart from one another and oriented in the same fashion as the holes 212 of the portion of the flange 210 that was removed or missing.

A second arc segment 254 is also connected to the cylindrical component 200 and is positioned between the first arc segment 252 and the arc attachment portion 224 of the cylindrical body 202. Although only two arc segments are shown in FIG. 5, in some embodiments, only a single arc segment need be connected with the cylindrical body 202, and in some embodiments, more than two arc segments can be connected with the cylindrical body 202. In such embodiments that include two or more arc segments, the arc segments are spaced apart from one another along the axial direction A.

Each arc segment 250 extends between a first attachment end 260 and a second attachment end 262 along the circumferential direction C. Each arc segment 250 also extends between an outer surface 266 and an inner surface 268 along the radial direction R (FIG. 8). The first arc segment 252 extends between the prefabricated flange 256 and an arc attachment end 270 along the axial direction A (FIG. 8). The second arc segment 254 extends between a first arc attachment end 280 and a second arc attachment end 290 along the axial direction A (FIG. 8). Moreover, each of the arc segments 250 can be formed of a rigid material. For instance, in some embodiments, the arc segments 250 are formed from a CMC material. To ensure the arc segments 250 are pliable when being connected with the cylindrical body 202, the arc segments 250 can be connected with the cylindrical body 202 while in a green state. The arc segments 250 can also be other suitable rigid materials as well.

With reference still to FIG. 5, when the arc segments 250 are connected with the cylindrical component 200, the first attachment end 260 of each arc segment 250 connects with the first attachment portion 220 of the cylindrical component 200 and the second attachment end 262 of each arc segment 250 connects with the second attachment portion 222 of the cylindrical component 200. The first and second attachment ends 260, 262 of the arc segments 250 can be connected with respective first and second attachment portions 220, 222 in a number of suitable manners as will be explained more fully below.

As shown in FIG. 6, one exemplary method for connecting the arc segments 250 with the cylindrical component 200 is provided. For this embodiment, the first attachment end 260 of the arc segment 250 includes an inner inclined surface 302 and an opposing outer inclined surface 304 along its axial cross section. The inner and outer inclined surfaces 302, 304 converge at a tip 305. The inner inclined surface 302 inclines radially outward as first attachment end 260 extends toward tip 305 and outer inclined surface 304 inclines radially inward as first attachment end 260 extends toward tip 305. In this way, for this embodiment, the first attachment end 260 has an axial cross section shaped generally as an isosceles triangle. In some embodiments, the tip 305 can be flat such that the first attachment end 260 has an axial cross section shaped generally as an isosceles trapezoid. In other embodiments, tip 305 can be rounded. In yet other embodiments, first attachment end 260 can have an axial cross section having other suitable geometries.

Likewise, the second attachment end 262 includes an inner inclined surface 312 and an opposing outer inclined surface 314 along its axial cross section. The inner and outer inclined surfaces 312, 314 converge at a tip 315. The inner inclined surface 312 inclines radially outward as second attachment end 262 extends toward tip 315 and outer inclined surface 314 inclines radially inward as second attachment end 262 extends toward tip 315. In this way, for this embodiment, the second attachment end 262 has an axial cross section shaped generally as an isosceles triangle. In some embodiments, the tip 315 can be flat such that the second attachment end 262 has an axial cross section shaped generally as an isosceles trapezoid. In other embodiments, tip 315 can be rounded. In yet other embodiments, second attachment end 262 can have an axial cross section having other suitable geometries.

The inner and outer inclined surfaces of the first attachment end 260 and the second attachment end 262 can be formed into the arc segments in any suitable fashion. For instance, the inclined surfaces can be machined into the arc segments. As another example, the arc segment can be formed of a CMC material and laid up with plies. The plies can be laid up in such a way so that the inclined surfaces are formed. In some embodiments, the plies can be laid up to form the inclined surfaces and then the surfaces can be finish machined to the desired angle of inclination.

During forming of the first attachment portion 220 and the second attachment portion 222, for this embodiment, the first attachment portion 220 is machined such that the first attachment portion 220 includes an inner inclined surface 226 and an opposing outer inclined surface 228 along its axial cross section. The inner and outer inclined surfaces 226, 228 converge at a tip 229. The inner inclined surface 226 inclines radially outward as first attachment portion 220 extends toward tip 229 and outer inclined surface 228 inclines radially inward as first attachment portion 220 extends toward tip 229. In this way, for this embodiment, the first attachment portion 220 has an axial cross section shaped generally as an isosceles triangle. In some embodiments, the tip 229 can be flat such that the first attachment portion 220 has an axial cross section shaped generally as an isosceles trapezoid. In other embodiments, tip 229 can be rounded. In yet other embodiments, first attachment portion 220 can have an axial cross section having other suitable geometries.

In a similar fashion, the second attachment portion 222 is machined such that the second attachment portion 222 includes an inner inclined surface 232 and an opposing outer inclined surface 234 along its axial cross section. The inner and outer inclined surfaces 232, 234 converge at a tip 235. The inner inclined surface 232 inclines radially outward as second attachment portion 222 extends toward tip 235 and outer inclined surface 234 inclines radially inward as second attachment portion 222 extends toward tip 235. In this way, for this embodiment, the second attachment portion 222 has an axial cross section shaped generally as an isosceles triangle. In some embodiments, the tip 235 can be flat such that the second attachment portion 222 has an axial cross section shaped generally as an isosceles trapezoid. In other embodiments, tip 235 can be rounded. In yet other embodiments, second attachment portion 222 can have an axial cross section having other suitable geometries.

To connect the arc segment 250 with the cylindrical body 202, the first attachment end 260 is positioned proximate the first attachment portion 220 of the cylindrical component 200 and the second attachment end 262 is positioned proximate the second attachment portion 222 of the cylindrical component 200 as shown in FIG. 6. More particularly, the tip 305 of the first attachment end 260 of the arc segment 250 is positioned proximate the tip 229 of the first attachment portion 220 of the cylindrical body 202 and the tip 315 of the second attachment end 262 of the arc segment 250 is positioned proximate the tip 235 of the second attachment portion 222 of the cylindrical body 202. Tip 305 can be spaced apart from tip 229 along the circumferential direction C or can be positioned directly adjacent tip 229. Likewise, tip 315 can be spaced apart from tip 235 along the circumferential direction C or can be positioned directly adjacent tip 235.

Then, the first attachment end 260 is connected with the first attachment portion 220 by one or more plies 330 to form a first scarf joint or first joint 242. Likewise, the second attachment end 262 is connected with the second attachment portion 222 by one or more plies 330 to form a second scarf joint or second joint 244. For this embodiment, at least one of the one or more plies 330 extends between and attaches the outer inclined surface 228 of the first attachment portion 220 with the outer inclined surface 304 of the first attachment end 260 and at least one of the one or more plies 330 extends between and attaches the inner inclined surface 226 of the first attachment portion 220 with the inner inclined surface 302 of the first attachment end 260. In a similar fashion, at least one of the one or more plies 330 extends between and attaches the outer inclined surface 234 of the second attachment portion 222 with the outer inclined surface 314 of the second attachment end 262 and at least one of the one or more plies 330 extends between and attaches the inner inclined surface 232 of the second attachment portion 222 with the inner inclined surface 312 of the second attachment end 262.

More particularly still, for this embodiment, a plurality of plies 330 are laid up to attach the outer inclined surface 228 of the first attachment portion 220 with the outer inclined surface 304 of the first attachment end 260 and a plurality of plies 330 are laid up to attach the inner inclined surface 226 of the first attachment portion 220 with the inner inclined surface 302 of the first attachment end 260. Similarly, a plurality of plies 330 are laid up to attach the outer inclined surface 234 of the second attachment portion 222 with the outer inclined surface 314 of the second attachment end 262 and a plurality of plies 330 are laid up to attach the inner inclined surface 232 of the second attachment portion 222 with the inner inclined surface 312 of the second attachment end 262. The dual inclined surfaces at the first and second attachment portions 220, 222 and the first and second attachment ends 260, 262 provide more surface area to which the plies 330 can attach when they are laid up. This allows the laid up plies to more securely attach to the arc segment 250 and the cylindrical component 200 and provides for a secure connection between the arc segment 250 and the cylindrical component 200.

Notably, for this embodiment, the one or more plies 330 include one or more cover plies 332. As shown in FIG. 6, cover plies 332 extend between and connect the outer surface 206 of the cylindrical body 202 with the outer surface 266 of the arc segment 250 at the first and second joints 242, 244. In a similar fashion, cover plies 332 extend between and connect the inner surface 208 of the cylindrical body 202 with the inner surface 268 of the arc segment 250 at the first and second joints 242, 244. The cover plies 332 provide additional bonding between the arc segment 250 and the cylindrical component 200. The cover plies 332 can be finish machined to shape the repaired cylindrical component 200 to the desired shape.

Figure 9:
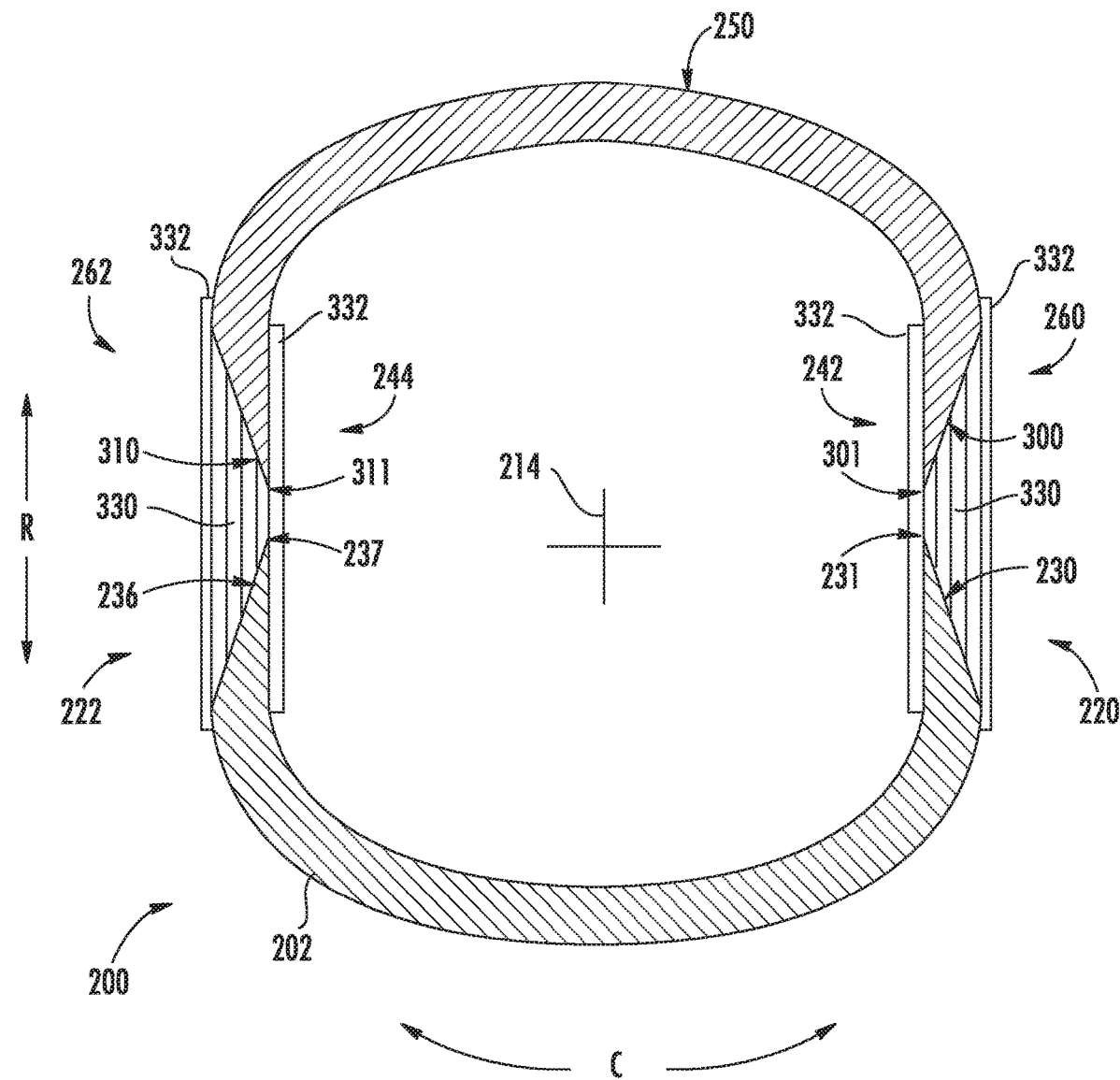
FIG. 9 provides an axial cross-sectional view of an exemplary cylindrical component connecting with an exemplary arc segment according to various exemplary embodiments of the present subject matter.

FIG. 9 provides an axial cross-sectional view of another exemplary embodiment of cylindrical component 200 connecting with arc segment 250 according to various embodiments of the present subject matter. For the depicted embodiment of FIG. 9, the first attachment end 260 of the arc segment 250 includes an inclined surface 300 along its axial cross section. The inclined surface 300 is inclined radially inward as the first attachment end 260 extends toward its tip 301. In other embodiments, the inclined surface 300 can be inclined radially outward as the first attachment end 260 extends toward its tip 301. Similarly, the second attachment end 262 of the arc segment 250 includes an inclined surface 310 along its axial cross section. The inclined surface 310 is inclined radially inward as the second attachment end 262 extends toward its tip 311. In other embodiments, the inclined surface 310 can be inclined radially outward as the second attachment end 262 extends toward its tip 311. The inclined surfaces 300, 310 of the first and second attachment ends 260, 262 can be machined into the arc segment 250, laid up to form the desired inclined shape, a combination of the foregoing, etc.

Likewise, for the depicted embodiment of FIG. 9, the first attachment portion 220 of the cylindrical body 202 includes an inclined surface 230 along its axial cross section. The inclined surface 230 is inclined radially inward as the first attachment portion 220 extends toward its tip 231. In this way, the tip 231 of the first attachment portion 220 is positioned proximate the tip 301 of the first attachment end 260 of the arc segment 250. In other embodiments, the inclined surface 230 can be inclined radially outward as the first attachment portion 220 extends toward its tip 231. Similarly, the second attachment portion 222 of the cylindrical body 202 includes an inclined surface 236 along its axial cross section. The inclined surface 236 is inclined radially inward as the second attachment portion 222 extends toward its tip 237. In this manner, the tip 237 of the second attachment portion 222 is positioned proximate the tip 311 of the second attachment end 262 of the arc segment 250. In other embodiments, the inclined surface 236 can be inclined radially outward as the second attachment portion 222 extends toward its tip 237. The inclined surfaces 230, 236 of the first and second attachment portions 220, 222 can be machined into the cylindrical body 202 as the damaged region DR is removed (FIG. 3) or can be machined into the cylindrical body 202 as a separate machining process.

To connect the arc segment 250 with the cylindrical body 202, the first attachment end 260 is positioned proximate the first attachment portion 220 of the cylindrical component 200 and the second attachment end 262 is positioned proximate the second attachment portion 222 of the cylindrical component 200 as shown in FIG. 9. More particularly, the tip 231 of the first attachment portion 220 is positioned proximate the tip 301 of the first attachment end 260 of the arc segment 250 and the tip 237 of the second attachment portion 222 is positioned proximate the tip 311 of the second attachment end 262 of the arc segment 250. Then, the first attachment end 260 is connected with the first attachment portion 220 by one or more plies 330 to form first joint 242. Likewise, the second attachment end 262 is connected with the second attachment portion 222 by one or more plies 330 to form second joint 244. For this embodiment, at least one of the one or more plies 330 extends between and attaches the inclined surface 230 of the first attachment portion 220 with the inclined surface 300 of the first attachment end 260 and at least one of the one or more plies 330 extends between and attaches the inclined surface 236 of the second attachment portion 222 with the inclined surface 310 of the second attachment end 262. More particularly still, for this embodiment, a plurality of plies 330 are laid up to attach the inclined surface 230 of the first attachment portion 220 with the inclined surface 300 of the first attachment end 260 and a plurality of plies 330 are laid up to attach the inclined surface 236 of the second attachment portion 222 with the inclined surface 310 of the second attachment end 262. The inclined surfaces at the attachment portions 220, 222 and the attachment ends 260, 262 provide more surface area to which the plies 330 can attach when they are laid up. This allows the laid up plies to more securely attach to the arc segment 250 and the cylindrical component 200 and provides for a secure connection between the arc segment 250 and the cylindrical component 200. In addition, one or more cover plies 332 can be laid up to further secure the cylindrical body 202 with the arc segment 250 as shown in FIG. 9.

Figure 10:
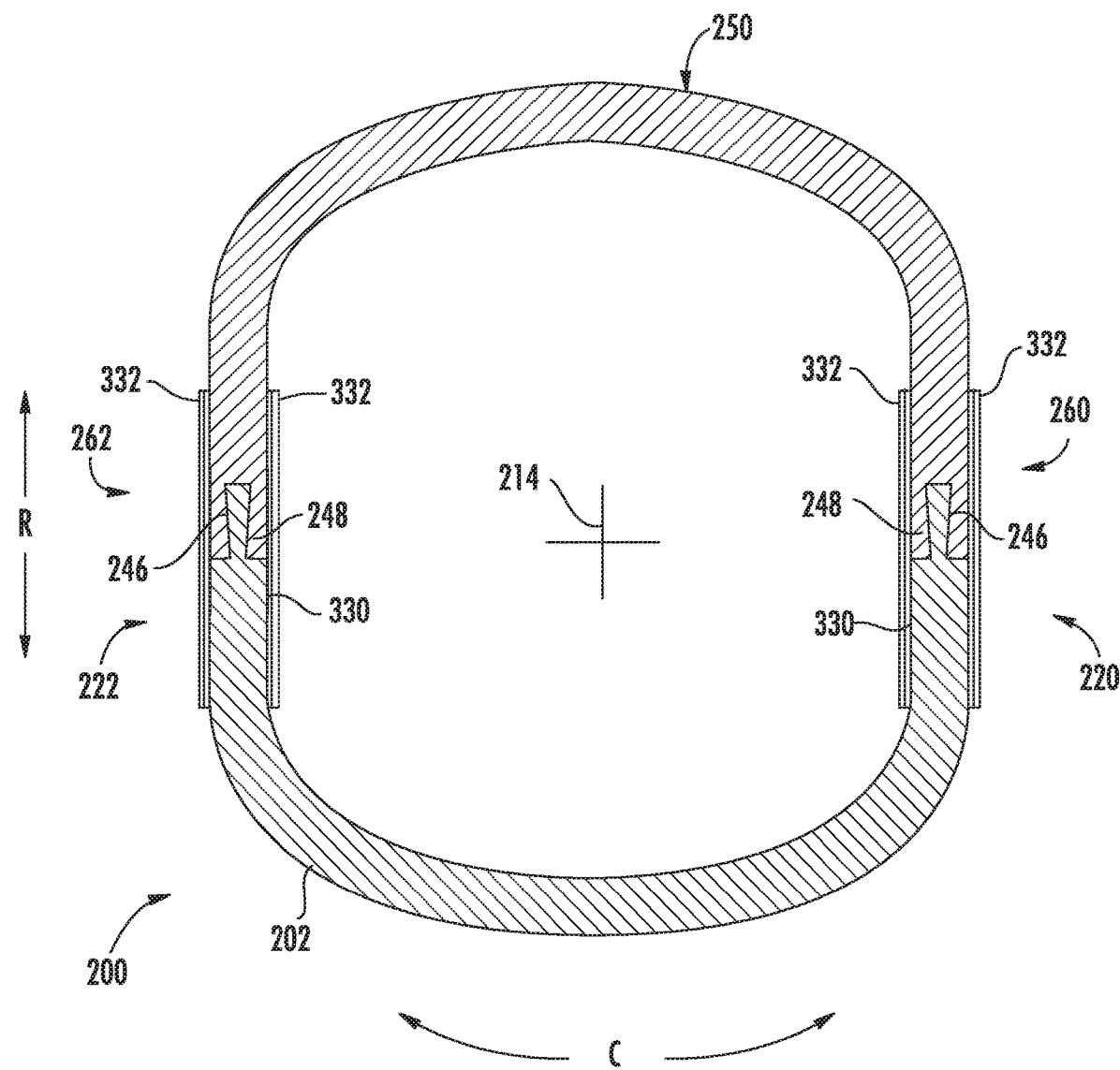
FIG. 10 provides an axial cross-sectional view of an exemplary cylindrical component connecting with an exemplary arc segment according to various exemplary embodiments of the present subject matter.

FIG. 10 provides an axial cross-sectional view of yet another exemplary embodiment of cylindrical component 200 connecting with arc segment 250 according to various embodiments of the present subject matter. For the depicted embodiment of FIG. 10, the first and second attachment portions 220, 222 of the cylindrical component 200 include interlocking features 246 and the first and second attachment ends 260, 262 of the arc segment 250 include interlocking features 248 that are complementary to the interlocking features 246 of the first and second attachment portions 220, 222. More particularly, for this embodiment, the interlocking features 246 of the first and second attachment portions 220, 222 and the interlocking features 248 of the first and second attachment ends 260, 262 are respective male and female portions of a flaring dovetail configuration. The interlocking features 246, 248 can have other suitable geometries, such as e.g., fir trees, rounded dovetails, finger projections, etc.

To connect the first and second attachment ends 260, 262 of the arc segment 250 with the respective first and second attachment portions 220, 222 of the cylindrical component 200, the interlocking features 248 of the first and second attachment ends 260, 262 are interlocked with the interlocking features 246 of the first and second attachment portions 220, 222, respectively. Then, as further shown in FIG. 10, plies 330 are overlaid over the interlocked joints to further secure the arc segment 250 with the cylindrical component 200. One or more cover plies 332 can be laid up to further secure the cylindrical body 202 with the arc segment 250 as shown in FIG. 10.

Returning to FIGS. 3 through 8 and more particularly to FIG. 7, after the arc segments 250 are connected with the cylindrical body 202 of the cylindrical component 200, the arc segments 250 are connected with the cylindrical component 200 with one or more plies 340. The arc segments 250 provide structural braces to which the plies 340 can attach such that they can be laid up to replace the missing portions of the cylindrical component 200. For this embodiment, plies 340 are laid up along the axial direction A such that they extend between and connect the first arc segment 252 with the second arc segment 254. The plies 340 are laid up along the arc of the arc segments 250 (i.e., along the circumferential direction C) such that the plies 340 repair the cylindrical body 202. In a similar fashion, plies 340 are laid up along the axial direction A such that they extend between and connect the second arc segment 254 with the cylindrical body 202, or more particularly, the arc attachment portion 224 of the cylindrical body 202. In some alternative embodiments, plies 340 can be laid up along the axial direction A such that they extend from the first arc segment 252, connect with the second arc segment 254, and then connect with the arc attachment portion 224 of the cylindrical body 202. The plies 340 can connect the arc segments 250 with the cylindrical body 202 in any suitable manner. Examples are provided below.

As shown in FIG. 8, one exemplary method for connecting the arc segments 250 with the cylindrical component 200 with the one or more plies 340 is provided. For this embodiment, the first arc segment 252 includes arc attachment end 270 that includes an inner inclined surface 274 and an opposing outer inclined surface 276 along its circumferential cross section. The inner and outer inclined surfaces 274, 276 converge at a tip 277. The inner inclined surface 274 inclines radially outward as arc attachment end 270 extends toward tip 277 and outer inclined surface 276 inclines radially inward as arc attachment end 270 extends toward tip 277. In this way, for this embodiment, the arc attachment end 270 of the first arc segment 252 has a circumferential cross section shaped generally as an isosceles triangle. In some embodiments, the tip 277 can be flat such that the arc attachment end 270 has a circumferential cross section shaped generally as an isosceles trapezoid. In other embodiments, tip 277 can be rounded. In yet other embodiments, arc attachment end 270 can have a circumferential cross section having other suitable geometries.

The second arc segment 254 includes first arc attachment end 280 and second arc attachment end 290 spaced from the first arc attachment end 280 along the axial direction A. The first arc attachment end 280 of the second arc segment 254 includes an inner inclined surface 284 and an opposing outer inclined surface 286 along its circumferential cross section. The inner and outer inclined surfaces 284, 286 converge at a tip 287. The inner inclined surface 284 inclines radially outward as first arc attachment end 280 extends toward tip 287 and outer inclined surface 286 inclines radially inward as first arc attachment end 280 extends toward tip 287. In this way, for this embodiment, the first arc attachment end 280 of the second arc segment 254 has a circumferential cross section shaped generally as an isosceles triangle. In some embodiments, the tip 287 can be flat such that the first arc attachment end 280 has a circumferential cross section shaped generally as an isosceles trapezoid. In other embodiments, tip 287 can be rounded. In yet other embodiments, first arc attachment end 280 can have a circumferential cross section having other suitable geometries. As further shown in FIG. 8, the tip 277 of the arc attachment end 270 of the first arc segment 252 is positioned proximate the tip 287 of the first arc attachment end 280 of the second arc segment 254. Tip 277 can be spaced apart from tip 287 along the axial direction A or can be positioned directly adjacent tip 277.

Similarly, the second arc attachment end 290 of the second arc segment 254 includes an inner inclined surface 294 and an opposing outer inclined surface 296 along its circumferential cross section. The inner and outer inclined surfaces 294, 296 converge at a tip 297. The inner inclined surface 294 inclines radially outward as second arc attachment end 290 extends toward tip 297 and outer inclined surface 296 inclines radially inward as second arc attachment end 290 extends toward tip 297. In this way, for this embodiment, the second arc attachment end 290 of the second arc segment 254 has a circumferential cross section shaped generally as an isosceles triangle. In some embodiments, the tip 297 can be flat such that the second arc attachment end 290 has a circumferential cross section shaped generally as an isosceles trapezoid. In other embodiments, tip 297 can be rounded. In yet other embodiments, second arc attachment end 290 can have a circumferential cross section having other suitable geometries.

The arc attachment portion 224 of the cylindrical body 202 includes an inner inclined surface 238 and an opposing outer inclined surface 240 along its circumferential cross section. The inner and outer inclined surfaces 238, 240 converge at a tip 233. The inner inclined surface 238 inclines radially outward as arc attachment portion 224 extends toward tip 233 and outer inclined surface 240 inclines radially inward as arc attachment portion 224 extends toward tip 233. In this way, for this embodiment, the arc attachment portion 224 of the cylindrical body 202 has a circumferential cross section shaped generally as an isosceles triangle. In some embodiments, the tip 233 can be flat such that the arc attachment portion 224 has a circumferential cross section shaped generally as an isosceles trapezoid. In other embodiments, tip 233 can be rounded. In yet other embodiments, arc attachment portion 224 can have a circumferential cross section having other suitable geometries. As further shown in FIG. 8, the tip 297 of the second arc attachment end 290 of the second arc segment 254 is positioned proximate the tip 233 of the Arc attachment portion 224 of the cylindrical body 202. Tip 297 can be spaced apart from tip 233 along the axial direction A or can be positioned directly adjacent tip 233.

To connect the first arc segment 252 with the cylindrical component 200, which in this embodiment is connected indirectly through the second arc segment 254, at least one of the one or more plies 340 extends between and attaches the inner inclined surface 274 of the arc attachment end 270 of the first arc segment 252 with the inner inclined surface 284 of the first arc attachment end 280 of the second arc segment 254. Likewise, at least one of the one or more plies 340 extends between and attaches the outer inclined surface 276 of the arc attachment end 270 of the first arc segment 252 with the outer inclined surface 286 of the first arc attachment end 280 of the second arc segment 254. More particularly, for this embodiment, a plurality of plies 340 are laid up to attach the inner inclined surface 274 of the first arc segment 252 with the inner inclined surface 284 of the first arc attachment end 280 of the second arc segment 254 and a plurality of plies 340 are laid up to attach the outer inclined surface 276 of the first arc segment 252 with the outer inclined surface 286 of the first arc attachment end 280 of the second arc segment 254. The dual inclined surfaces 274, 276 of the arc attachment end 270 of the first arc segment 252 and the dual inclined surfaces 284, 286 of the first arc attachment end 280 of the second arc segment 254 provide an advantageous amount of surface area to which the plies 340 can attach when they are laid up. This allows the laid up plies to more securely attach to the first arc segment 252 and the second arc segment 254 and provides for a secure connection between the first arc segment 252 and the second arc segment 254.

To connect the second arc segment 254 with the cylindrical body 202 of the cylindrical component 200, at least one of the one or more plies 340 are laid up such that they extend between and attach the inner inclined surface 294 of the second arc attachment end 290 of the second arc segment 254 with the inner inclined surface 238 of the arc attachment portion 224 of the cylindrical body 202. Similarly, at least one of the one or more plies 340 extends between and attaches the outer inclined surface 296 of the second arc attachment end 290 of the second arc segment 254 with the outer inclined surface 240 of the arc attachment portion 224 of the cylindrical body 202. More particularly, for this embodiment, a plurality of plies 340 are laid up to attach the inner inclined surface 294 of the second arc attachment end 290 of the second arc segment 254 with the inner inclined surface 238 of the arc attachment portion 224 of the cylindrical body 202 and a plurality of plies 340 are laid up to attach the outer inclined surface 296 of the second arc attachment end 290 of the second arc segment 254 with the outer inclined surface 240 of the arc attachment portion 224 of the cylindrical body 202. The dual inclined surfaces 294, 296 of the second arc attachment end 290 of the second arc segment 254 and the dual inclined surfaces 238, 240 of the arc attachment portion 224 of the cylindrical body 202 provide an advantageous amount of surface area to which the plies 340 can attach when they are laid up. This allows the laid up plies to more securely attach to the second arc segment 254 and the cylindrical body 202 and provides for a secure connection between the first arc segment 252, the second arc segment 254, and the cylindrical body 202. Furthermore, as shown in FIG. 8, one or more cover plies 342 can be laid up to further secure the cylindrical body 202 with the first and second arc segments 250.

Figure 11:
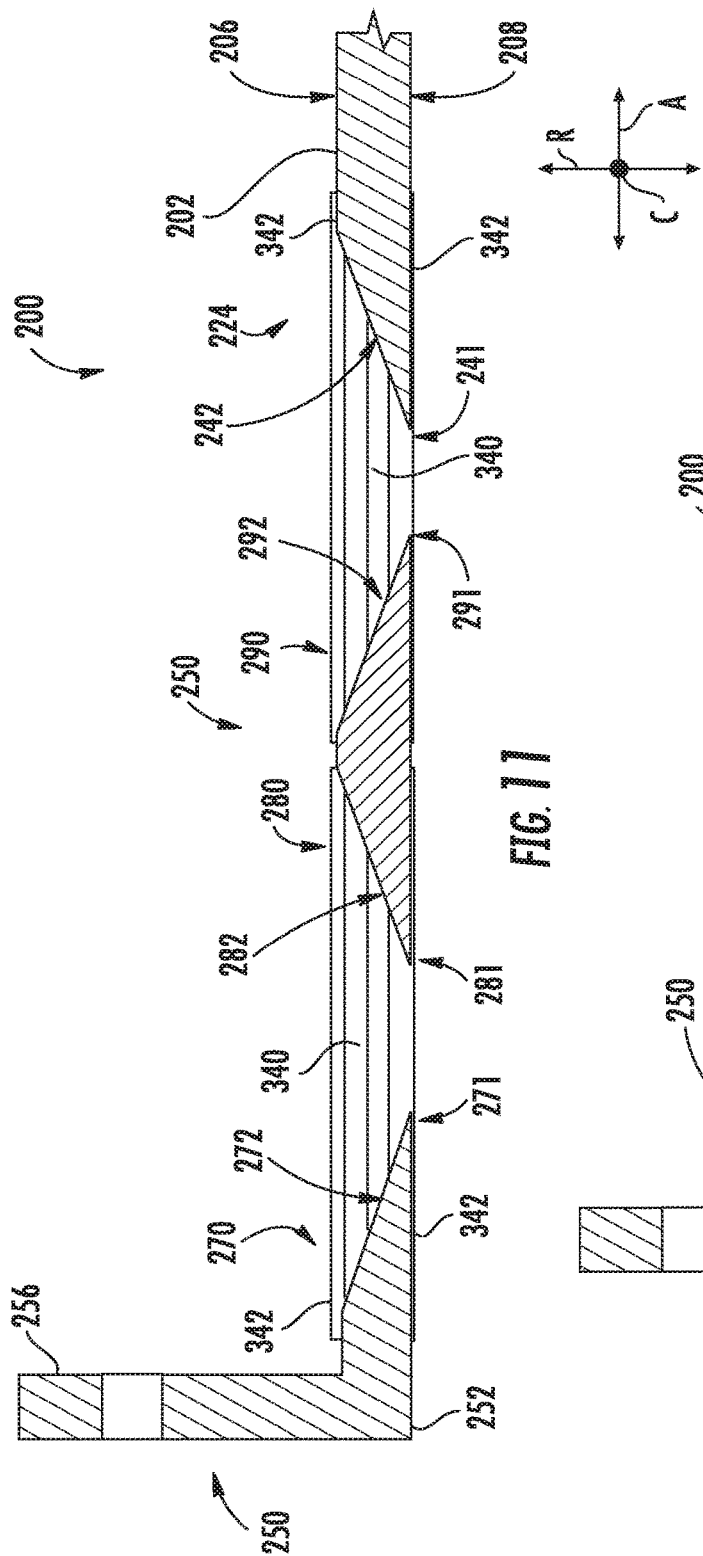
FIG. 11 provides a circumferential cross-sectional view of an exemplary cylindrical component depicting plies connecting exemplary arc segments with one another and the cylindrical component according to various exemplary embodiments of the present subject matter.

FIG. 11 provides a circumferential cross-sectional view of yet another exemplary embodiment of cylindrical component 200 connecting with arc segments 250 according to various embodiments of the present subject matter. For the depicted embodiment of FIG. 11, the first arc segment 252 includes arc attachment end 270 that includes an inclined surface 272 along its circumferential cross section. The inclined surface 272 is inclined radially inward as the arc attachment end 270 extends toward its tip 271. In this way, for this embodiment, the arc attachment end 270 has a circumferential cross section shaped generally as a right triangle. In other embodiments, the inclined surface 272 can be inclined radially outward as the arc attachment end 270 extends toward its tip 271. Tip 271 can be pointed, rounded, flat, etc.

The second arc segment 254 includes first arc attachment end 280 and second arc attachment end 290 spaced from the first arc attachment end 280 along the axial direction A. The first arc attachment end 280 of the second arc segment 254 includes an inclined surface 282 along its circumferential cross section. The inclined surface 282 is inclined radially inward as the first arc attachment end 280 extends toward its tip 281. In this way, for this embodiment, the first arc attachment end 280 has a circumferential cross section shaped generally as a right triangle. In other embodiments, the inclined surface 282 can be inclined radially outward as the first arc attachment end 280 extends toward its tip 281. Tip 281 can be pointed, rounded, flat, etc. As further shown in FIG. 11, the tip 271 of the arc attachment end 270 is positioned proximate the tip 281 of the first arc attachment end 280. Tip 271 can be spaced apart from tip 281 along the axial direction A or can be positioned directly adjacent tip 281.

Similarly, the second arc attachment end 290 of the second arc segment 254 includes an inclined surface 292 along its circumferential cross section. The inclined surface 292 is inclined radially inward as the second arc attachment end 290 extends toward its tip 291. In this way, for this embodiment, the second arc attachment end 290 has a circumferential cross section shaped generally as a right triangle. In other embodiments, the inclined surface 292 can be inclined radially outward as the second arc attachment end 290 extends toward its tip 291. Tip 291 can be pointed, rounded, flat, etc.

The arc attachment portion 224 of the cylindrical body 202 includes an inclined surface 242 along its circumferential cross section. The inclined surface 242 is inclined radially inward as the arc attachment portion 224 extends toward its tip 241. In this way, for this embodiment, the arc attachment portion 224 has a circumferential cross section shaped generally as a right triangle. In other embodiments, the inclined surface 242 can be inclined radially outward as the arc attachment portion 224 extends toward its tip 241. Tip 241 can be pointed, rounded, flat, etc. As further shown in FIG. 11, the tip 291 of the second arc attachment end 290 of the second arc segment 254 is positioned proximate the tip 241 of the arc attachment portion 224 of the cylindrical body 202. Tip 291 can be spaced apart from tip 241 along the axial direction A or can be positioned directly adjacent tip 241.

To connect the first arc segment 252 with the cylindrical component 200, which in this embodiment is connected indirectly through the second arc segment 254, at least one of the one or more plies 340 extends between and attaches the inclined surface 272 of the first arc segment 252 with the inclined surface 282 of the first arc attachment end 280 of the second arc segment 254. More particularly, for this embodiment, a plurality of plies 340 are laid up to attach the inclined surface 272 of the first arc segment 252 with the inclined surface 282 of the first arc attachment end 280 of the second arc segment 254. The inclined surface 272 of the arc attachment end 270 of the first arc segment 252 and the inclined surface 282 of the first arc attachment end 280 of the second arc segment 254 provide an advantageous amount of surface area to which the plies 340 can attach when they are laid up. This allows the laid up plies to more securely attach to the first arc segment 252 and the second arc segment 254 and provides for a secure connection between the first arc segment 252 and the second arc segment 254.

To connect the second arc segment 254 with the cylindrical component 200, at least one of the one or more plies 340 are laid up such that they extend between and attach the inclined surface 292 of the second arc segment 254 with the inclined surface 242 of the arc attachment portion 224 of the cylindrical body 202. More particularly, for this embodiment, a plurality of plies 340 are laid up to attach the inclined surface 292 of the second arc segment 254 with the inclined surface 242 of the arc attachment portion 224 of the cylindrical body 202. The inclined surface 292 of the second arc attachment end 290 of the second arc segment 254 and the inclined surface 242 of the arc attachment portion 224 of the cylindrical body 202 provide an advantageous amount of surface area to which the plies 340 can attach when they are laid up. This allows the laid up plies to more securely attach to the second arc segment 254 and the cylindrical body 202 and provides for a secure connection between the first arc segment 252, the second arc segment 254, and the cylindrical body 202. Furthermore, as shown in FIG. 11, one or more cover plies 342 can be laid up to further secure the cylindrical body 202 with the first and second arc segments 250.

Figure 12:
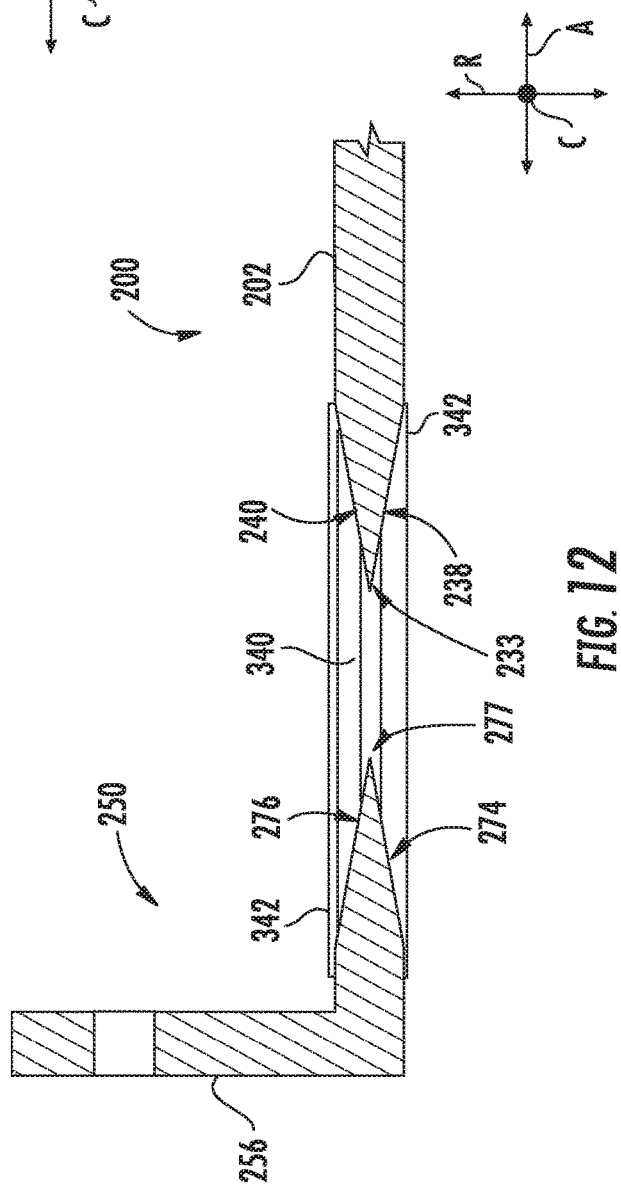
FIG. 12 provides a circumferential cross-sectional view of an exemplary cylindrical component depicting plies connecting an exemplary arc segment with the cylindrical component according to various exemplary embodiments of the present subject matter.

FIG. 12 provides a circumferential cross-sectional view of yet another exemplary embodiment of cylindrical component 200 connecting with arc segment 250 according to various embodiments of the present subject matter. For this embodiment, however, only a single arc segment 250 is utilized to repair the cylindrical component 200. As shown in FIG. 12, the arc segment 250 is connected directly with the cylindrical component 200 by the one or more plies 340 and one or more cover plies 342. In particular, the arc segment 250 is connected with the cylindrical component 200 in the same or similar manner as illustrated in FIG. 8 and described in the accompanying text.

After the plies 340 are laid up along the axial direction A to connect the arc segments 250 with the cylindrical body 202, the cylindrical component 200 can undergo one or more processes, such as e.g., a compaction process, a burnout process, a melt infiltration process, and a finish machining process. In particular, in some embodiments, after the plies 340 are laid up to connect the arc segments 250 with the existing cylindrical body 202, the cylindrical component 200 is cured to produce a single piece, unitary composite component, which is then fired and subjected to densification, e.g., silicon melt-infiltration, to form a final unitary composite cylindrical structure.

For instance, the repaired cylindrical component can be processed in an autoclave to produce a green state unitary repaired cylindrical component. Then, the green state repaired cylindrical component can be placed in a furnace to burn out excess binders or the like and then can be placed in a furnace with a piece or slab of silicon and fired to melt infiltrate the repaired cylindrical component with at least silicon. More particularly, for the repaired cylindrical component formed from CMC plies of prepreg tapes, heating (i.e., firing) the green state cylindrical component in a vacuum or inert atmosphere decomposes the binders, removes the solvents, and converts the precursor to the desired CMC material. The decomposition of the binders results in a porous CMC component; the component may undergo densification, e.g., melt infiltration (MI), to fill the porosity. In one example, where the green state repaired cylindrical component is fired with silicon, the repaired cylindrical component can undergo silicon melt-infiltration. However, densification can be performed using any known densification technique including, but not limited to, Silcomp, melt infiltration (MI), chemical vapor infiltration (CVI), polymer infiltration and pyrolysis (PIP), and oxide/oxide processes, and with any suitable materials including but not limited to silicon. In some embodiments, densification and firing may be conducted in a vacuum furnace or an inert atmosphere having an established atmosphere at temperatures above 1200° C. to allow silicon or other appropriate material or combination of materials to melt-infiltrate into the cylindrical component. The densified CMC cylindrical component hardens to a final unitary CMC repaired cylindrical component.

In some embodiments, the final unitary cylindrical component is finish machined, e.g., to bring the cylindrical component within tolerance, to shape the repaired cylindrical component to a predetermined geometry or desired shape, remove excess portions of material from the laid up plies, and/or add an environmental barrier coating (EBC) to the unitary repaired cylindrical component, e.g., to protect the repaired cylindrical component from the hot combustion gases 66 (FIG. 1). It will be appreciated that other methods or processes of forming composite cylindrical components, such as unitary composite repaired cylindrical component, can be used as well.

Figure 13:
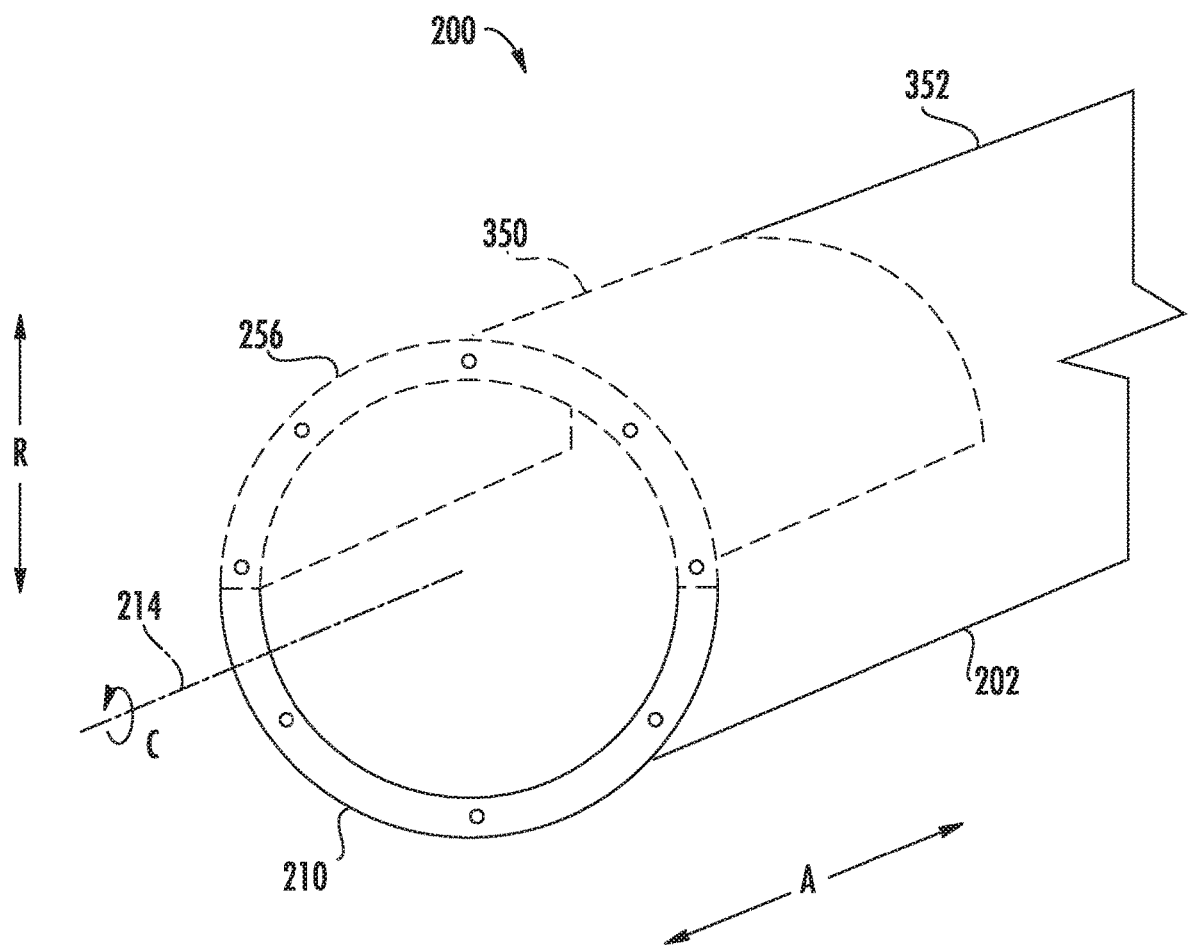
FIG. 13 provides a repaired cylindrical component according to various exemplary embodiments of the present subject matter.

FIG. 13 provides a repaired cylindrical component 200 according to various exemplary embodiments of the present subject matter. In particular, FIG. 13 depicts a cylindrical component repaired in accordance with the present subject matter described above. As shown, the final or repaired cylindrical component 200 thus includes a repaired portion 350 (shown by the dashed lines in FIG. 13) and a non-repaired portion 352. In particular, the cylindrical body 202 is formed at least in part by the repaired portion 350 and at least in part by the non-repaired portion 352. The repaired portion 350 of the cylindrical body 202 includes one or more of the arc segments extending along the circumferential direction C and connecting with the non-repaired portion 352 (e.g., the first and second attachment portions). The repaired portion 350 further includes plies laid up along the axial direction A to connect the one or more arc segments 250 with the non-repaired portion 352 of the cylindrical body 202. The flange 210 extends from the cylindrical body 202 along the radial direction R and is disposed about the cylindrical body 202 along the circumferential direction C. The flange 210 of the repaired cylindrical component 200 is formed at least in part by the repaired portion 350 and at least in part by the non-repaired portion 352. The repaired portion 350 of the flange 210 includes prefabricated flange 256 formed integrally with one of the one or more arc segments 250.

Figure 14:
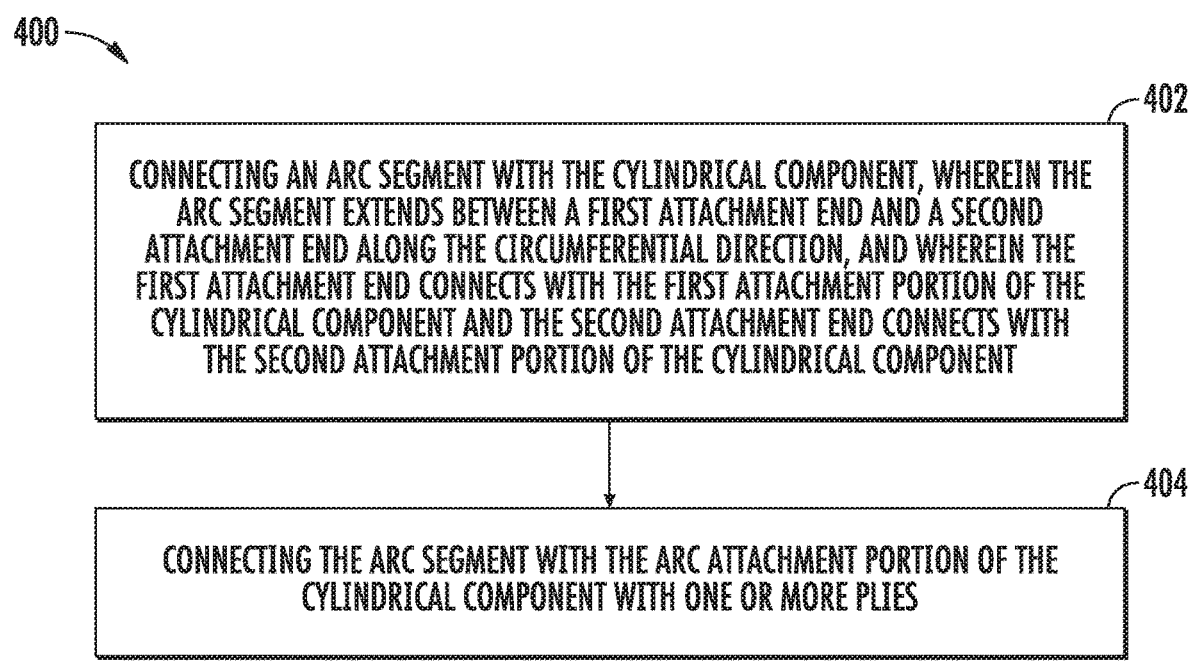
FIG. 14 provides an exemplary flow diagram for an exemplary method according to various embodiments of the present subject matter.

FIG. 14 provides a flow diagram of an exemplary method (400) according to an exemplary embodiment of the present subject matter. In particular, FIG. 14 provides a flow diagram for a method for repairing for repairing a cylindrical component. The cylindrical component can be formed of a composite material, such as e.g., a CMC material. The cylindrical component defines an axial direction, a radial direction, and a circumferential direction. The cylindrical component has a first attachment portion and a second attachment portion spaced apart from the first attachment portion along the circumferential direction and an arc attachment portion extending along the circumferential direction and connecting the first attachment portion with the second attachment portion.

At (402), the method (400) includes connecting an arc segment with the cylindrical component, wherein the arc segment extends between a first attachment end and a second attachment end along the circumferential direction, and wherein the first attachment end connects with the first attachment portion of the cylindrical component and the second attachment end connects with the second attachment portion of the cylindrical component. For instance, the first attachment end and the second attachment end can be the first and the second attachment ends 260, 262 illustrated and described herein. The first and second attachment portions can be the first and second attachment portions 220, 222 illustrated and described herein. For example, the first attachment end connects with the first attachment portion of the cylindrical component and the second attachment end connects with the second attachment portion of the cylindrical component can connect as illustrated in FIGS. 6, 9, 10 and described in the accompanying text, or in other exemplary ways illustrated and described herein.

In some implementations, for example, the first attachment end is connected with the first attachment portion by one or more plies and the second attachment end is likewise connected to the second attachment portion by one or more plies.

In some further implementations, the first attachment end includes an inner inclined surface and an opposing outer inclined surface along its axial cross section and the second attachment end includes an inner inclined surface and an opposing outer inclined surface along its axial cross section. In such implementations, the method further includes machining the first attachment portion such that the first attachment portion includes inclined surface and an opposing outer inclined surface along its axial cross section. The method also includes machining the second attachment portion such that the second attachment portion includes an inner inclined surface and an opposing outer inclined surface along its axial cross section. Moreover, in such implementations at least one of the one or more plies extends between and attaches the outer inclined surface of the first attachment portion with the outer inclined surface of the first attachment end and at least one of the one or more plies extends between and attaches the inner inclined surface of the second attachment portion with the inner inclined surface of the second attachment end. In some implementations, a plurality of plies can extend between and attach the inclined surfaces of the attachment portions and attachment ends.

In yet other implementations, the first attachment end includes an inclined surface along its axial cross section and the second attachment end includes an inclined surface along its axial cross section. In such implementations, the method further includes machining the first attachment portion such that the first attachment portion includes an inclined surface along its axial cross section. The method also includes machining the second attachment portion such that the second attachment portion includes an inclined surface along its axial cross section. In such implementations, at least one of the one or more plies extends between and attaches the inclined surface of the first attachment portion with the inclined surface of the first attachment end and at least one of the one or more plies extends between and attaches the inclined surface of the second attachment portion with the inclined surface of the second attachment end. In some implementations, a plurality of plies can extend between and attach the inclined surfaces of the attachment portions and attachment ends.

In some implementations, the first attachment end is connected with the first attachment portion by interlocking the first attachment end with the first attachment portion with a mechanical interlock. For instance, the first attachment end and the first attachment portion can include interlocking features, such as e.g., the male and female dovetail configuration shown in FIG. 10. When the interlocking features are interlocked to form a mechanical interlock. In such implementations, one or more plies can be overlaid over the interlocked joint to further secure the first attachment portion and the first attachment end to one another.

In some implementations, the arc segment is formed of a composite material, such as e.g., a CMC material. In such limitations, when the arc segment is attached to the cylindrical component, the arc segment is in a green state. This allows the arc segment to be more easily positioned to connect with the existing cylindrical body, as the arc segment is more pliable in the green state. Moreover, in some implementations, the arc segment is formed of a rigid material. For instance, the rigid material can be a CMC material. In some instances, the arc segment can be formed of a high temperature nickel alloy.

At (404), the method (400) includes connecting the arc segment with the arc attachment portion of the cylindrical component with one or more plies. FIGS. 8, 11, and 12 and the accompanying text provide exemplary methods for connecting the arc segment with the arc attachment portion of the cylindrical component with one or more plies.

In some implementations, the arc segment includes an inner inclined surface and an opposing outer inclined surface along its circumferential cross section. In such implementations, the method includes machining the arc attachment portion such that the arc attachment portion includes an inner inclined surface and an opposing outer inclined surface along its circumferential cross section. In addition, in such implementations, when the arc segment and the arc attachment portion of the cylindrical component are connected with the one or more plies, at least one of the one or more plies extends between and attaches the inner inclined surface of the arc attachment portion with the inner inclined surface of the arc segment and at least one of the one or more plies extends between and attaches the outer inclined surface of the arc attachment portion with the outer inclined surface of the arc segment.

In some implementations, the arc segment includes an inclined surface along its circumferential cross section. In such implementations, the method further includes machining the arc attachment portion such that the arc attachment portion includes an inclined surface along its circumferential cross section. Moreover, in such implementations, when the arc segment and the arc attachment portion of the cylindrical component are connected with the one or more plies, at least one of the one or more plies extends between and attaches the inclined surface of the arc attachment portion with the inclined surface of the arc segment.

In some implementations, the cylindrical component includes a cylindrical body extending along the axial direction and a flange extending from the cylindrical body along the radial direction and disposed about the cylindrical body along the circumferential direction. The cylindrical component defines a damaged region proximate the flange. In such implementations, the method further includes removing the damaged region and at least a portion of the flange. In addition, in such implementations the arc segment connected with the cylindrical component includes a prefabricated flange shaped complementary to the flange of the cylindrical component, and wherein when the arc segment is connected with the cylindrical component, the prefabricated flange forms at least a part of the flange of the cylindrical component.

In some implementations, one or more second arc segments are connected with the cylindrical components, each of the second arc segments extending along the circumferential direction and spaced apart from the arc segment and one another along the axial direction.

FIG. 15 provides a flow diagram of an exemplary method (500) according to an exemplary embodiment of the present subject matter. In particular, FIG. 15 provides a flow diagram for a method for repairing a cylindrical component defining a damaged region prior to being repaired and an axial direction, a radial direction, and a circumferential direction. In such implementations, the cylindrical component includes a cylindrical body extending along the axial direction and a flange extending from the cylindrical body along the radial direction and disposed about the cylindrical body along the circumferential direction. In some implementations, for example, the cylindrical component is a combustor liner for a gas turbine engine.

At (502), the method (500) includes removing the damaged region, wherein at least a portion of the flange is disposed within the damaged region. As an example, with reference to FIGS. 3 and 4, the cylindrical component 200 can define a damaged region DR (FIG. 3). The damaged region DR includes the flange 210 of the cylindrical component 200. Indeed, in FIG. 3, a portion of the flange 210 is missing. As shown particularly in FIG. 4, the damaged region DR can be removed, including a portion of the flange 210.

At (504), the method (500) includes forming a first attachment portion and a second attachment portion into the cylindrical body of the cylindrical component, the first attachment portion and the second attachment portion each extending along the axial direction and spaced apart from one another along the circumferential direction. For instance, the first attachment portion and the second attachment portion can be formed by any suitable material removal process. FIG. 4 provides an exemplary cylindrical component having a first attachment portion and a second attachment portion formed into the cylindrical body. As depicted, the first attachment portion and the second attachment portion each extend along the axial direction and are spaced apart from one another along the circumferential direction.

At (506), the method (500) includes connecting an arc segment that includes a prefabricated flange shaped complementary to the flange with the cylindrical component, wherein the arc segment extends between a first attachment end and a second attachment end along the circumferential direction, and wherein the first attachment end connects with the first attachment portion of the cylindrical component and the second attachment end connects with the second attachment portion of the cylindrical component, and wherein when the arc segment is connected with the cylindrical component, the prefabricated flange forms at least a part of the flange. FIG. 5 provides an exemplary arc segment having a prefabricated flanged connected with the existing cylindrical body. As shown, the prefabricated flanged is shaped complementary to the flanged of the cylindrical component. As further shown in FIG. 5, the arc segment extends between and connects with the cylindrical body at the first attachment portion and the second attachment portion. Moreover, the prefabricated flange is shown forming at least a part of the flange. In this way, the prefabricated flange repairs the damaged edge flange.

At (508), the method (500) includes connecting the arc segment and the cylindrical component with one or more plies. FIGS. 8, 11, and 12 and the accompanying text provide exemplary methods for connecting the arc segment with the arc attachment portion of the cylindrical component with one or more plies.

In some implementations, the arc segment is connected directly with the cylindrical component by the one or more plies. In other implementations, the arc segment is connected indirectly with the cylindrical component by the one or more plies.

In some implementations, one or more second arc segments are connected with the cylindrical components, each of the second arc segments extending along the circumferential direction and spaced apart from the arc segment and one another along the axial direction, and wherein each of the one or more second arc segments are formed of a rigid material.

In some implementations, one of the one or more second arc segments is positioned between the arc segment and the arc attachment portion of the cylindrical body and includes a first arc attachment end and a second arc attachment end spaced apart from one another along the axial direction. The first arc attachment end and the second arc attachment end each having an inclined surface along their circumferential cross sections. In such implementations, the arc segment includes an arc attachment end having an inclined surface along its circumferential cross section. Moreover, the arc attachment portion of the cylindrical component has an inclined surface along its circumferential cross section. In such implementations, the arc segment is connected with the cylindrical component with the one or more plies by: at least one of the one or more plies extending between and connecting the inclined surface of the arc attachment end of the arc segment and the inclined surface of the first arc attachment end of the second arc segment and at least one of the one or more plies extending between and connecting the inclined surface of the second arc attachment end of the second arc segment and the inclined surface of the arc attachment portion of the cylindrical component.

In some implementations, the arc segment includes an arc attachment end extending along the circumferential direction between the first attachment end and the second attachment end. The arc attachment end includes an inclined surface inclined with respect to the radial direction along its circumferential cross section. In such implementations, the method includes forming an arc attachment portion into the cylindrical body of the cylindrical component, the arc attachment portion extending along the circumferential direction and connecting the first attachment portion with the second attachment portion. Moreover, when the arc attachment portion is formed, the arc attachment portion includes an inclined surface inclined with respect to the radial direction along its circumferential cross section. In addition, when the arc segment is connected with the cylindrical component with the one or more plies, at least one of the one or more plies extends between and attaches the inclined surface of the arc attachment portion with the inclined surface of the arc attachment end.

In some implementations, the cylindrical component is formed of a CMC material. In such implementations, after the arc segment is connected with the cylindrical component by the one or more plies, the method further includes compacting the cylindrical component; burning out the cylindrical component; and densifying the cylindrical component.

In some implementations, the cylindrical body extends between an outer surface and an inner surface along the radial direction and the arc segment extends between an outer surface and an inner surface along the radial direction. In such implementations, the method further includes connecting the arc segment and the cylindrical component with one or more cover plies, wherein at least one of the one or more cover plies extends between and connects the outer surface of the cylindrical body and the outer surface of the arc segment and at least one of the one or more cover plies extends between and connects the inner surface of the cylindrical body and the inner surface of the arc segment.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for repairing a cylindrical component defining an axial direction, a radial direction, and a circumferential direction, the cylindrical component having a first attachment portion and a second attachment portion spaced apart from the first attachment portion along the circumferential direction and an arc attachment portion extending along the circumferential direction and connecting the first attachment portion with the second attachment portion, the method comprising:
   connecting an arc segment with the cylindrical component, wherein the arc segment extends between a first attachment end and a second attachment end along the circumferential direction, and wherein the first attachment end connects with the first attachment portion of the cylindrical component and the second attachment end connects with the second attachment portion of the cylindrical component; and
   connecting the arc segment with the arc attachment portion of the cylindrical component with one or more plies.

2. The method of claim 1, wherein the arc segment is formed of a composite material, and wherein when the arc segment is attached to the cylindrical component, the arc segment is in a green state.

3. The method of claim 1, wherein the first attachment end is connected with the first attachment portion by one or more plies.

4. The method of claim 3, wherein the first attachment end comprises an inner inclined surface and an opposing outer inclined surface along its axial cross section and the second attachment end comprises an inner inclined surface and an opposing outer inclined surface along its axial cross section, and wherein the method further comprises:

machining the first attachment portion such that the first attachment portion comprises an inner inclined surface and an opposing outer inclined surface along its axial cross section;

machining the second attachment portion such that the second attachment portion comprises an inner inclined surface and an opposing outer inclined surface along its axial cross section;

wherein at least one of the one or more plies extends between and attaches the outer inclined surface of the first attachment portion with the outer inclined surface of the first attachment end and at least one of the one or more plies extends between and attaches the inner inclined surface of the second attachment portion with the inner inclined surface of the second attachment end.

5. The method of claim 3, wherein the first attachment end comprises an inclined surface along its axial cross section and the second attachment end comprises an inclined surface along its axial cross section, and wherein the method further comprises:

machining the first attachment portion such that the first attachment portion comprises an inclined surface along its axial cross section;

machining the second attachment portion such that the second attachment portion comprises an inclined surface along its axial cross section;

wherein at least one of the one or more plies extends between and attaches the inclined surface of the first attachment portion with the inclined surface of the first attachment end and at least one of the one or more plies extends between and attaches the inclined surface of the second attachment portion with the inclined surface of the second attachment end.

6. The method of claim 1, wherein the first attachment end is connected with the first attachment portion by interlocking the first attachment end with the first attachment portion with a mechanical interlock.

7. The method of claim 1, wherein the arc segment is formed from a rigid material.

8. The method of claim 1, wherein the arc segment comprises an inner inclined surface and an opposing outer inclined surface along its circumferential cross section, and wherein the method further comprises:

machining the arc attachment portion such that the arc attachment portion comprises an inner inclined surface and an opposing outer inclined surface along its circumferential cross section;

wherein when the arc segment and the arc attachment portion of the cylindrical component are connected with the one or more plies, at least one of the one or more plies extends between and attaches the inner inclined surface of the arc attachment portion with the inner inclined surface of the arc segment and at least one of the one or more plies extends between and attaches the outer inclined surface of the arc attachment portion with the outer inclined surface of the arc segment.

9. The method of claim 1, wherein the arc segment comprises an inclined surface along its circumferential cross section, and wherein the method further comprises:

machining the arc attachment portion such that the arc attachment portion comprises an inclined surface along its circumferential cross section;

wherein when the arc segment and the arc attachment portion of the cylindrical component are connected with the one or more plies, at least one of the one or more plies extends between and attaches the inclined surface of the arc attachment portion with the inclined surface of the arc segment.

10. The method of claim 1, wherein the cylindrical component comprises a cylindrical body extending along the axial direction and a flange extending from the cylindrical body along the radial direction and disposed about the cylindrical body along the circumferential direction, and wherein the cylindrical component defines a damaged region proximate the flange, and wherein the method further comprises:

removing the damaged region and at least a portion of the flange;

wherein the arc segment connected with the cylindrical component comprises a prefabricated flange shaped complementary to the flange of the cylindrical component, and wherein when the arc segment is connected with the cylindrical component, the prefabricated flange forms at least a part of the flange of the cylindrical component.

11. The method of claim 1, wherein one or more second arc segments are connected with the cylindrical components, each of the second arc segments extending along the circumferential direction and spaced apart from the arc segment and one another along the axial direction.

12. A method for repairing a cylindrical component defining a damaged region prior to being repaired and an axial direction, a radial direction, and a circumferential direction, wherein the cylindrical component comprises a cylindrical body extending along the axial direction and a flange extending from the cylindrical body along the radial direction and disposed about the cylindrical body along the circumferential direction, the method comprising:

removing the damaged region, wherein at least a portion of the flange is disposed within the damaged region;

forming a first attachment portion and a second attachment portion into the cylindrical body of the cylindrical component, the first attachment portion and the second attachment portion each extending along the axial direction and spaced apart from one another along the circumferential direction;

connecting an arc segment comprising a prefabricated flange shaped complementary to the flange with the cylindrical component, wherein the arc segment extends between a first attachment end and a second attachment end along the circumferential direction, and wherein the first attachment end connects with the first attachment portion of the cylindrical component and the second attachment end connects with the second attachment portion of the cylindrical component, and wherein when the arc segment is connected with the cylindrical component, the prefabricated flange forms at least a part of the flange; and connecting the arc segment and the cylindrical component with one or more plies.

13. The method of claim 12, wherein the arc segment is connected directly with the cylindrical component by the one or more plies.

14. The method of claim 12, wherein one or more second arc segments are connected with the cylindrical components, each of the second arc segments extending along the circumferential direction and spaced apart from the arc segment and one another along the axial direction, and wherein each of the one or more second arc segments are formed of a rigid material.

15. The method of claim 12, wherein one of the one or more second arc segments is positioned between the arc segment and the arc attachment portion of the cylindrical body and comprises a first arc attachment end and a second arc attachment end spaced apart from one another along the axial direction, the first arc attachment end and the second arc attachment end each having an inclined surface along their circumferential cross sections, and wherein the arc segment comprises an arc attachment end having an inclined surface along its circumferential cross section, and wherein the arc attachment portion of the cylindrical component has an inclined surface along its circumferential cross section, and wherein the arc segment is connected with the cylindrical component with the one or more plies by: at least one of the one or more plies extending between and connecting the inclined surface of the arc attachment end of the arc segment and the inclined surface of the first arc attachment end of the second arc segment and at least one of the one or more plies extending between and connecting the inclined surface of the second arc attachment end of the second arc segment and the inclined surface of the arc attachment portion of the cylindrical component.

16. The method of claim 12, wherein the arc segment comprises an arc attachment end extending along the circumferential direction between the first attachment end and the second attachment end, and wherein the arc attachment end comprises an inclined surface inclined with respect to the radial direction along its circumferential cross section, and wherein the method further comprises:
forming an arc attachment portion into the cylindrical body of the cylindrical component, the arc attachment portion extending along the circumferential direction and connecting the first attachment portion with the second attachment portion;
wherein, when the arc attachment portion is formed, the arc attachment portion comprises an inclined surface inclined with respect to the radial direction along its circumferential cross section;
wherein when the arc segment is connected with the cylindrical component with the one or more plies, at least one of the one or more plies extends between and attaches the inclined surface of the arc attachment portion with the inclined surface of the arc attachment end.

17. The method of claim 12, wherein the cylindrical component is formed of a ceramic matrix composite material, and wherein after the arc segment is connected with the cylindrical component by the one or more plies, wherein the method further comprises:
compacting the cylindrical component;
burning out the cylindrical component; and
densifying the cylindrical component.

18. The method of claim 12, wherein the cylindrical body extends between an outer surface and an inner surface along the radial direction, and wherein the arc segment extends between an outer surface and an inner surface along the radial direction, and wherein the method further comprises:
connecting the arc segment and the cylindrical component with one or more cover plies, wherein at least one of the one or more cover plies extends between and connects the outer surface of the cylindrical body and the outer surface of the arc segment and at least one of the one or more cover plies extends between and connects the inner surface of the cylindrical body and the inner surface of the arc segment.

19. The method of claim 12, wherein the cylindrical component is a combustor liner for a gas turbine engine.

* * * * *